(12) United States Patent
Shimada et al.

(10) Patent No.: US 7,178,037 B2
(45) Date of Patent: Feb. 13, 2007

(54) COMPUTER PROGRAM COPY MANAGEMENT SYSTEM

(75) Inventors: Muneki Shimada, Tokyo (JP); Shinichi Okamoto, Tokyo (JP); Masaharu Yoshimori, Tokyo (JP); Tsutomu Inui, Chiba (JP); Keiso Shimakawa, Kanagawa (JP); Toyoshi Okada, Tokyo (JP); Makoto Kubo, Tokyo (JP); Mitsuhiro Nakamura, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 732 days.

(21) Appl. No.: 10/079,935

(22) Filed: Feb. 20, 2002

(65) Prior Publication Data

US 2002/0114461 A1 Aug. 22, 2002

(30) Foreign Application Priority Data

Feb. 20, 2001 (JP) ............................. 2001-044358
Feb. 19, 2002 (JP) ............................. 2002-041890

(51) Int. Cl.
*G06F 11/30* (2006.01)
*G06F 12/14* (2006.01)
*H04L 9/32* (2006.01)

(52) U.S. Cl. ...................... 713/193; 380/201; 380/277; 726/26; 726/31

(58) Field of Classification Search ................ 713/193; 380/200, 277, 201; 726/26, 31–33
See application file for complete search history.

(56) References Cited

U.S. PATENT DOCUMENTS 5,805,699 A * 9/1998 Akiyama et al. ............. 705/58

(Continued)

FOREIGN PATENT DOCUMENTS

CN 1166029 11/1997

(Continued)

OTHER PUBLICATIONS

Chinese Office Action dated Feb. 10, 2006, with translation, for corresponding Chinese Application 02802144.4.

(Continued)

*Primary Examiner*—Gilberto Barron
*Assistant Examiner*—Samson Lemma
(74) *Attorney, Agent, or Firm*—Katten Muchin Rosenman LLP

(57) ABSTRACT

An ID (MID) is attached to each individual optical disk, and content is encrypted with a Content-Key and registered. In addition, a system server device maintains a Client ID of a client terminal device, HDD-ID of a hard disk drive (HDD), and MC-ID of a memory card respectively held as user entry information. When the user wants to copy the content, together with the optical disk MID, the MC-ID is sent to the system server side. The system server device identifies the user by referencing the MC-ID in the user entry information, and returns a Content-Key, which is used when encoding content. On the user side, content stored in the optical disk is decrypted using the returned Content-Key and copied to the HDD. Accordingly, copying of content is allowed only for an authorized user who is the lawful owner of the storage media.

17 Claims, 15 Drawing Sheets

U.S. PATENT DOCUMENTS

| | | | |
|---|---|---|---|
| 5,857,021 | A | 1/1999 | Kataoka et al. |
| 6,510,502 | B1 * | 1/2003 | Shimizu ................. 711/164 |
| 6,745,166 | B1 * | 6/2004 | Sugahara et al. ............ 705/57 |
| 6,889,211 | B1 * | 5/2005 | Yoshiura et al. ............. 705/58 |
| 2002/0176575 | A1 * | 11/2002 | Qawami et al. ........... 380/201 |

FOREIGN PATENT DOCUMENTS

| | | |
|---|---|---|
| EP | 1 047 062 | 10/2000 |
| EP | 1 081 912 | 3/2001 |
| JP | 9-044353 | 2/1997 |
| JP | 9-069044 | 3/1997 |
| JP | 09-097174 | 4/1997 |
| JP | 9-134311 | 5/1997 |
| JP | 9-134330 | 5/1997 |
| JP | 10-083297 | 3/1998 |
| JP | 2000-285027 | 10/2000 |
| JP | 2000-357370 | 12/2000 |

OTHER PUBLICATIONS

Notification of Reason(s) for Refusal dated Mar. 23, 2005.

Mary Foley. Microsoft says that when it comes to customer privacy, it has learned its lesson. http://news.zdnet.com/2100-9595_22-527150.html.

Small Memory Cards to Protect Music Copyrights Nikkei Electronics, Mar. 22, 1999; No. 739: pp. 49-53.

Personal Computer Holds it ID Nekkei Electronics, Apr. 5, 1999; No. 740:pp. 97-113.

Foley, "Microsoft and Piracy: Try, try Again" ZDNET News (Online) Jan. 11, 2001.

Foley, "Whistler Build Adds Anti-Piracy Lock" ZDNET News (Online) Jan. 9, 2001.

Motoike, et al. "Content Distribution Service Using DVD-ROM" Matsushita Technical Journal, Oct. 18, 1998, vol. 44, No. 5, pp. 25-33.

* cited by examiner

COMPUTER PROGRAM COPY MANAGEMENT SYSTEM

This application Is related lo Japanese Patent Application No. 2001-044258 filed on Feb. 20, 2001 and No. 2002-041890 filed on Feb. 19, 2002, based on which this application claims priority under the Paris Convention and the contents of which are incorporated herein by reference.

BACKGROUND OF THE INVENTION

1. Field of the Invention

The present invention relates to a copy management system which performs copy management of a computer program such as game content, movie content, music content, or an application program; computer-readable storage media stored with a client terminal device information processing program; computer-readable storage media stored with a management server device information processing program; a client terminal device information processing program; a management server device information processing program; and a copy management method thereof.

2. Description of the Related Art

These days, video game machines running video games based on game content stored on a storage media such as a CD-ROM, DVD-ROM, or semiconductor memory have become widely popularized.

A user purchases a storage media stored with desired game content and plays a video game by reproducing such storage media with a video game machine. In most cases, the user gradually begins to collect new video games. Over time this results in the user accumulating storage media stored with each game content.

However, in many cases, a video game machine is only provided with only one storage media reproducing mechanism. Therefore, in order to play a different video game, the storage media currently loaded in the video game unit must be removed, and the storage media stored with the game content to be played loaded, which is a bothersome task The applicant discloses a video game machine made capable of incorporating an internally mounted or externally attached high-capacity, for example, in the order of tens of gigabyte, hard disk drive (HDD).

In the case of such a video game machine, the game content stored in each storage media are respectively copied to the HDD and it is possible to reproduce and use the desired game content from this HDD. By using such a HDD, it is possible to eliminate the bother of loading the memory medium from the reproducing mechanism of the video game machine.

A computer program such as game content should only be usable by a user who has properly acquired software (storage media) stored with that computer program, such as by purchasing it.

However, in cases where a computer program stored on a storage media is made copyable onto a secondary storage media, the computer program stored on a single storage media may be copied by a plurality of users onto a respective secondary media and used, raising fears of unauthorized copies.

SUMMARY OF THE INVENTION

The object of the present invention is to provide a copy management system, which aims to prevent unauthorized use of content by performing copy management that allows copy of a computer program only by an authorized user; computer-readable storage media stored with a client terminal device information processing program; computer-readable storage media stored with a management server device information processing program; a client terminal device information processing program; a management server device information processing program; and a copy management method thereof.

According to the present invention, a storage media stored with content encrypted with an encryption key is attached with a unique identification number and distributed to a user. An identification number is also attached to the device used when the user copies the content.

The above-mentioned device transmits the identification number of the above-mentioned storage media and the device ID to a management server device. The management server device comprises a database, which registers the identification number of the device used by each user. The management server device identifies the user by referencing the identification number of the device registered in the database and the identification number of the device transmitted from the user device. The management server device transmits a decryption key for decrypting content stored in the storage media to the user device when the user has been identified through this referencing.

The user device decrypts the content stored in the storage media in accordance with the decryption key distributed from the administrator side and copies the content.

Accordingly, it is possible to allow content copying by an authorized user who is the lawful owner of the storage media, and it is possible to prevent unauthorized copy of the content.

DETAILED DESCRIPTION OF THE PREFERRED EMBODIMENTS

The present invention can be applied to a copy management system, which performs copy management of a computer program.

A computer program may include, for examples game content, music content, movie content, or an application program. A storage media recorded with a computer program may include an optical disk such as a DVD-ROM or CD-ROM as well as semiconductor memory. Secondary storage media upon which a copy of a computer program is stored may include, for example, a hard disk (HD), DVD-RAM, and a magneto-optical disk (MO).

In the following, "content" will collectively refer to the above-mentioned game content, music content, movie content, or application.

Overall Structure of Copy Management System

Figure 1:
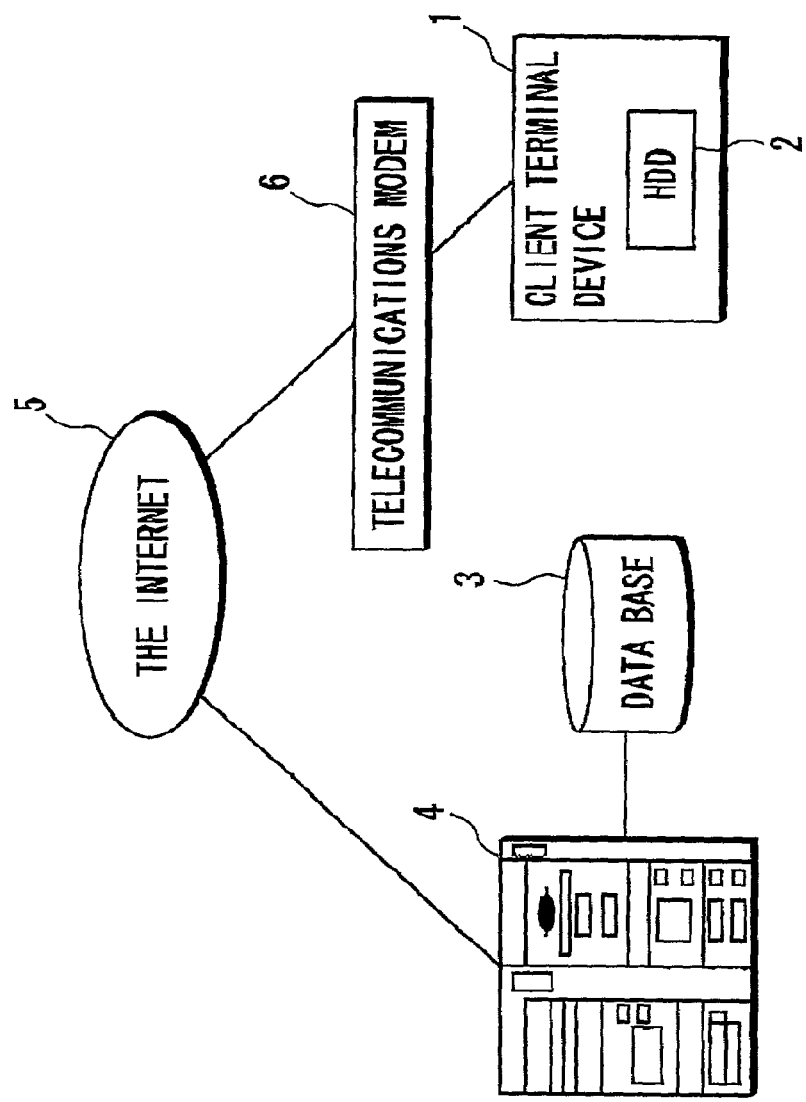
FIG. 1 is a block diagram showing system configuration of a copy management system of a first embodiment of the present invention.

To begin with, FIG. 1 shows the overall structure of a copy management system of the first embodiment of the present invention. As shown in FIG. 1, the copy management system of this first embodiment includes client terminal device 1, which comprises a content reproducing function (execute function) stored in an optical disk and a network communications function.

A hard disk drive 2 for copying content stored in an optical disk is connected to this client terminal device 1.

In addition, communications modem 6 for connecting to a network such as the Internet 5 is connected to this client terminal device 1.

It is noted that communications modem 6 may be provided in an externally attached configuration with client terminal device 1 as shown in FIG. 1. Alternatively, communications modem 6 may be provided internally mounted within client terminal device 1.

In addition, the copy management system may include system server device 4 comprising database 3, which is stored with user entry information.

The copy management system of the first embodiment Is configured by connecting this system server device 4 and the client terminal device 1 mentioned above to each other via a network such as the Internet 5.

Configuration of Client Terminal Device

Figure 2:
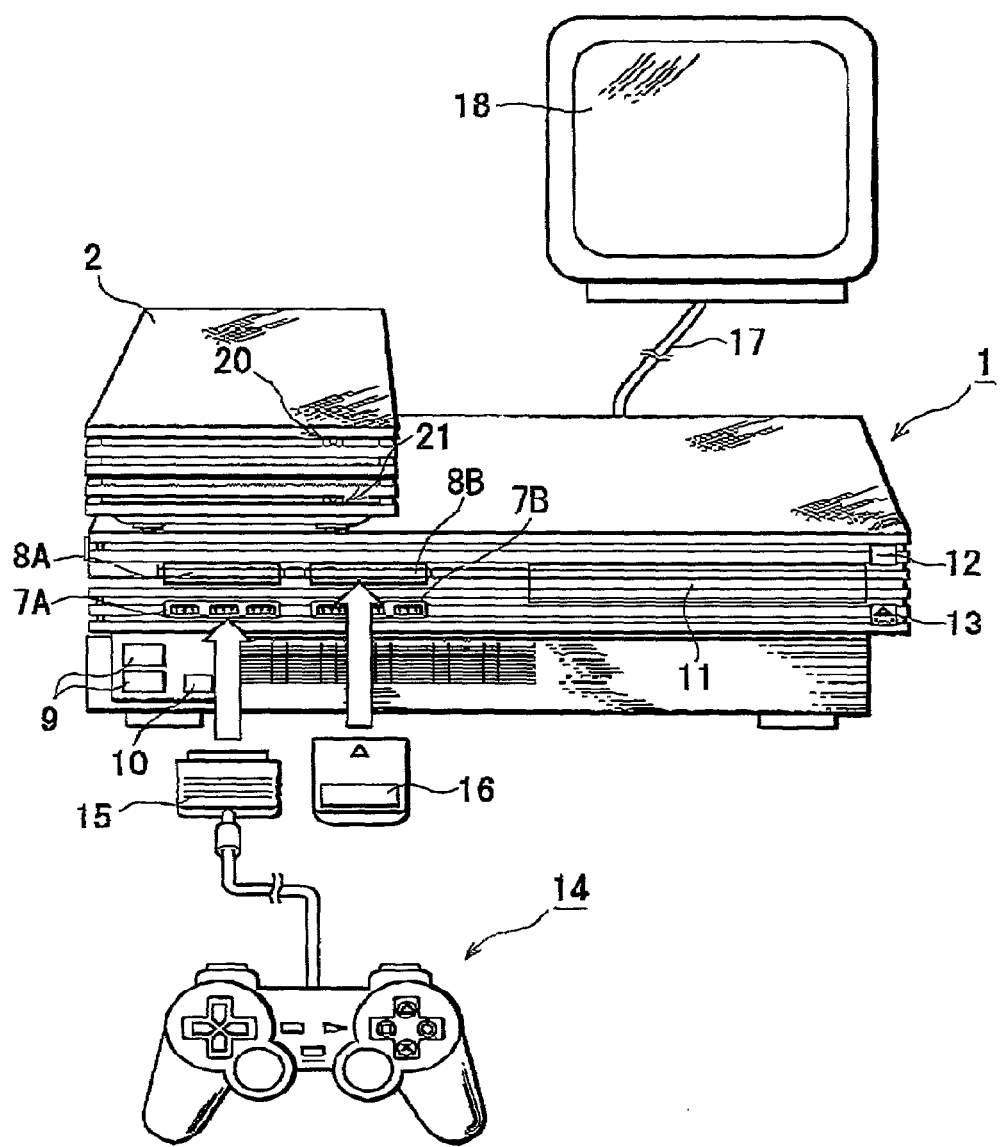
FIG. 2 is a perspective view showing the external appearance of a client terminal device and a hard disk drive (HDD) configuring a copy management system.

FIG. 2 shows a schematic diagram of the external appearance of client terminal device 1. As shown in FIG 2, controller connectors 7A and 73, and memory card loaders 8A and 8B are disposed on the front side of client terminal device 1.

In addition, two universal serial bus (USB) terminals 9, for connection to USB compatible equipment, and an IEEE 1394 terminal 10, which is compatible with a possible data transmission rate of, for example, up to 400 Mbps, are disposed on the front of this client terminal device 1.

In addition, a tray-shaped disk loader 11, for loading an optical disk, may be disposed on the front side of client terminal device 1.

In addition, a reset button 12 for causing the executing or reproducing of content to reset and a tray operating button 13 for operating insertion/ejection of the tray of optical disk loader 11 are disposed on the front side of client terminal device 1.

A power switch, an audio/video output terminal (AV multi output terminal), a PC card slot, a digital optical output terminal, and an AC power input terminal, etc. are disposed on the back panel of client terminal device 1.

The AV multi output terminal is connected to television receiver 18, which is used as a monitor, via AV cable 17. The audio signal and video signal output from client terminal device 1 is supplied to television receiver 18, which is used as a monitor, via this AV multi output terminal and AV cable 17. This allows the video of the above-mentioned content to be displayed on television receiver 18. In addition, the audio of the above-mentioned content is emitted through the speaker device of the television receiver 18.

Controller connectors 7A and 7B are respectively connected to controller 14 via controller cable 15.

Memory cards for saving, which perform saving (storing) and readout of game data are loaded into memory card loaders 8A and 8B.

Configuration of Hard Disk Drive

Next, the casing placed on the top surface of client terminal device 1 in FIG. 2 is hard disk drive 2 (hereafter referred to as HDD 2) . This HDD 2 is provided with an internal high-capacity, for example 40 GB, hard disk. Game content equivalent to that stored on tens of DVD-ROMs can be copied onto this HDD 2.

Power lamp 20, which is illuminated when the power is on, and writing indicator lamp 21, which is illuminated when the hard disk is engaged in writing, are disposed on the front panel of HDD 2. On the back panel of HDD 2, there is disposed at least a power switch and a data input/output terminal.

In the case where HDD 2 is connected to client terminal device 1, a PC card is inserted into the above-mentioned PC card slot disposed on the back panel of client terminal device 1. While in this state, a connector cable is connected to the PC card. At the other end of the connector cable is connected the data input/output terminal of HDD 2. As a result, client terminal device 1 and HDD 2 are electrically connected to each other.

It is noted that in this example, HDD 2 is in a separate unit than client terminal device 1, and is externally attached to client terminal device 1. Alternatively, this HDD 2 may be provided internally mounted in client terminal device 1.

In addition, client terminal deice 1 and HDD 2 are connected via a PC card and a connector cable. Alternatively, a USB connection terminal or an IEEE 1394 connection terminal may be disposed on the back panel (or even on the front panel) of HDD 2, and HDD 2 and client terminal device 1 may be connected via either of these connection terminals.

Electrical Configuration of Client Terminal Device

Figure 3:
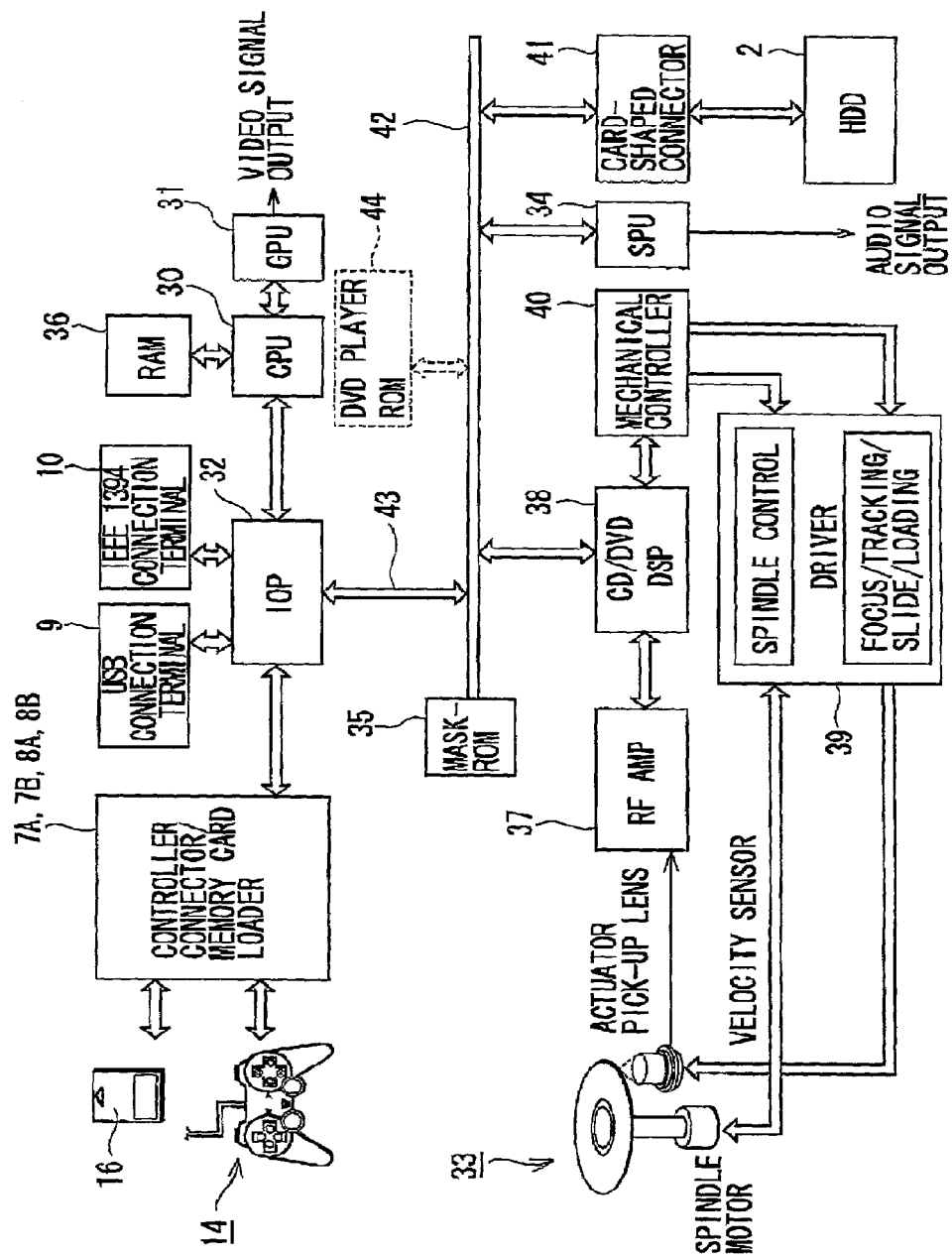
FIG. 3 is a block diagram showing an electrical configuration of a client terminal device.

FIG. 3 is a block diagram of client terminal device 1. As shown in FIG. 3, client terminal device 1 comprises CPU 30, graphics processor 31, and IO processor (IOP) 32.

In addition, client terminal device 1 comprises optical disk controller 33, which controls reproducing of an optical disk such as a CD-ROM or DVD-ROM, and sound processor unit (SPU) 34.

In addition, client terminal device 1 comprises MASK-ROM 35, which is stored with an operating system program that CPU 30 and IOP 32 execute, and RAM 36, which functions as a buffer that is temporarily stored with data read out from the work area of CPU 30 or the optical disk.

In addition, client terminal device 1 comprises CD/DVD DSP 38, which employs error correction processing (CRC processing) on reproducing output from an optical disk that is supplied via RF amplifier 37 of optical disk controller 33, and outputs it.

In addition, client terminal device 1 comprises driver 39 and mechanical controller 40, which, for example, control such as rotation of a spindle motor in optical disk controller 33, control optical pick-up focus and tracking, and control disk tray loading.

In addition, client terminal device 1 comprises card-shaped connector 41 to which the above-mentioned PC card is connected.

Each of these components are connected to each other mainly by bus lines 42 and 43.

It is noted that reproducing of video content stored in a DVD-ROM is performed based on DVD driver software stored in the memory card. Alternatively, reproducing of video content may be performed based on DVD driver software burned into semiconductor memory 44 (DVD player ROM) internally mounted within client terminal device 1.

The operating system program is stored in MASK-ROM 35. CPU 30 performs overall control of client terminal device 1 based on the operating system program stored in this MASK-ROM 35.

Respective hardware identification numbers (Hardware IDs) of controller 14, memory card 16, and HDD 2, which are respectively connected to controller connectors 7A and 7B, memory card loaders 8A and 8B, and card-shaped connector 41, are stored in MASK-ROM 35. IOP 32 communicates with hardware such as controller 14, memory card 16, and HDD 2 based on the hardware ID stored in this MASK-ROM 35, and identifies the hardware connected to, for example, each of connection terminals 7A, 7B, 8A, and 8B, and card-shaped connector 41 and recognizes it.

It is noted that a Hardware ID means an ID generically attached to each piece of hardware, in a manner such as one overall ID for client terminal device 1, one ID for memory card 16, and one ID for HDD 2.

On the other hand, the Client ID, MC-ID and HDD-ID described below are hardware-specific IDs attached to each client terminal device 1, each memory card 16, and each HDD 2, respectively.

GPU 31 performs rendering in accordance with render directions from CPU 30, and stores the image rendered in a frame buffer not shown in the Figures. In addition, GPU 31 has a function, which is used as a geometric transfer engine for performing processing such as coordinate transform.

In the case where, for example, game content stored in the optical disk utilizes "3-D graphics", this GPU 31 generates a virtual 3-D object through aggregation of triangle-shaped polygons. GPU 31 then performs various calculations so as to generate an image obtained by capturing the generated 3-D object with a virtual camera. More specifically, GPU 31 performs, for example, perspective projection (calculation of coordinates when nodes of each polygon configuring a three-dimensional object are projected on a virtual screen), so as to perform rendering.

In addition, GPU 31 performs rendering into a frame buffer while utilizing the geometry transfer engine as needed in accordance with render instructions from CPU 30. The video signal corresponding to this rendered image is then output.

Meanwhile, SPU 34 comprises functions such as an adaptive differential pulse code modulation (ADPCM) decoding function, which reproduces audio data that has been subjected to adaptive prediction coding; a reproducing function, which reproduces and outputs (audio out) an audio signal such as effect sound by reproducing waveform data stored in a sound buffer; and a modulation function, which modulates and reproduces waveform data stored in a sound buffer. This SPU 34 operates as a so-called sampling sound generator. SPU 34 generates an audio signal such as musical sound and effect sound based on waveform data stored in the sound buffer in conformity with instruction from CPU 30.

With this sort of client terminal device 1, once the power has been turned on, CPU 30 and IOP 32 begin reading the CPU 30 operating system program and the IOP 32 operating system program, respectively from MASK-ROM 35.

CPU 30 centrally controls each component of client terminal device 1 in conformity with the CPU 30 operating system program.

IOP 32 controls input and output of data among, for example, controller 14, memory card 16, and HDD 2 in conformity with the IOP 32 operating system program.

After performing initialization processing such as a performance check, CPU 30 controls optical disk controller 33 to perform reproducing control of content stored in an optical disk in conformity with the CPU 30 operating system program.

In the case where the content played back is game content of a video game, CPU 30 directs GPU 31 and SPU 34 to control display of images from the game content and sound production of, for example, effect sound and musical sound in conformity with instructions (commands) from a player that are received from controller 14 via IOP 32.

In the case where the content played back is movie content, CPU 30 directs GPU 31 and SPU 34 to control display of video from the movie content and sound production in conformity with instructions from a player that are received from controller 14 via IOP 32.

Copy Management Operation

In a situation where content stored in an optical disk is to be copied to HDD 2, the copy management system performs copy management in the following manner.

Installation of Installer

To begin with, in order to copy content stored in an optical disk to HDD 2 with this copy management system, a copy controlling application program (installer) needs to be executed at client terminal device 1. In the case of this example, the installer is stored in the optical disk together with the contents. Client terminal device 1 installs this installer before copying the content.

In the case of installing an installer, the user inserts the optical disk stored with the installer in client terminal device 1. CPU 30 in client terminal device 1 reads out, automatically upon insertion of an optical disk (auto run), or in accordance with operation of controller 14 by the user, the installer stored in this optical disk, and stores this in memory card 16 or RAM 36.

In the situation where the user has instructed the content stored in the optical disk to be copied, CPU 30 executes the installer stored in memory card 16 or RAM 36. CPU 30 controls copying process of the content by executing this installer.

It is noted that an optical disk stored with the installer only may be manufactured by the system publisher side and distributed to the user.

Alternatively, a memory card stored with the installer only may even be manufactured by a system publisher side and distributed to the user. In this case, it is possible that the installation procedure for the installer may be abbreviated.

Otherwise, a ROM stored with the installer may be provided within client terminal device 1. In this case, it is possible that the installation procedure for the installer may be abbreviated.

Content Encryption

Figure 4:
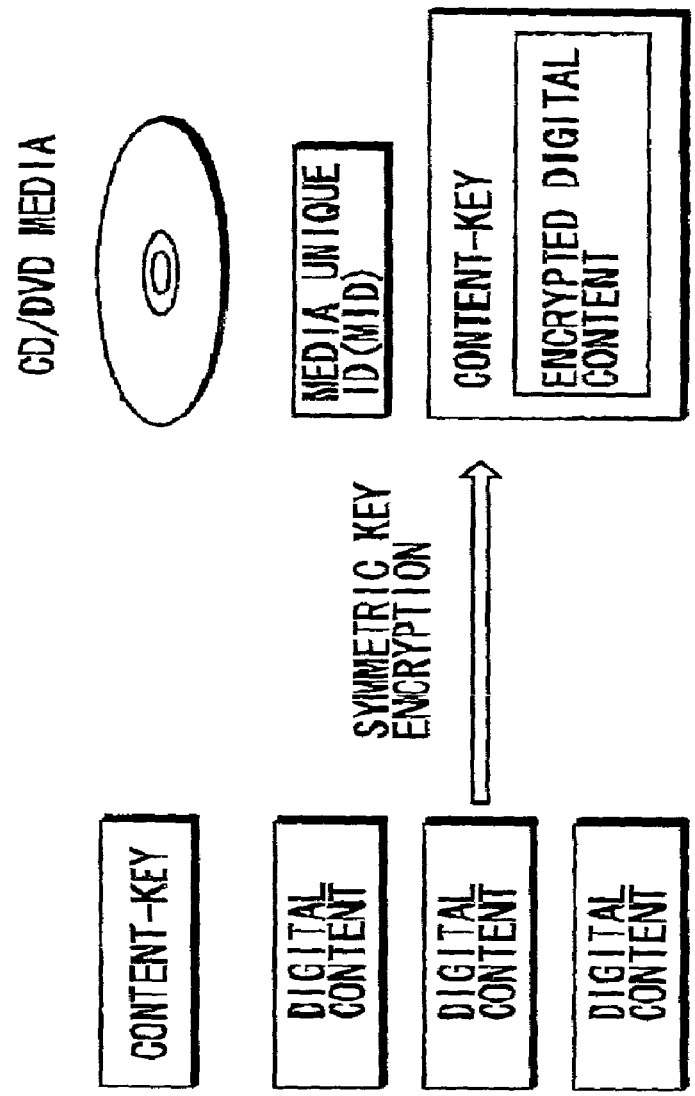
FIG. 4 is a diagram for describing an optical disk stored with contents encrypted with a Content-Key and utilized in such copy management system.

As shown in FIG. 4, encryption processing is employed on content stored in the optical disk using a symmetric key that differs for each content (Content-Key). In addition, besides such encryption-processed content, the optical disk may also be stored with an ID which is peculiar to each individual disk (Media Unique ID or MID).

User Registration

Next, with the copy management system of this first embodiment, in the case where content is copied from the optical disk to HDD 2, user registration is performed in system server device 4 using the "memory card ID (MC-ID)" uniquely attached to each memory card 16. When this user registration has not been performed, content copy is not authorized.

Figure 5:
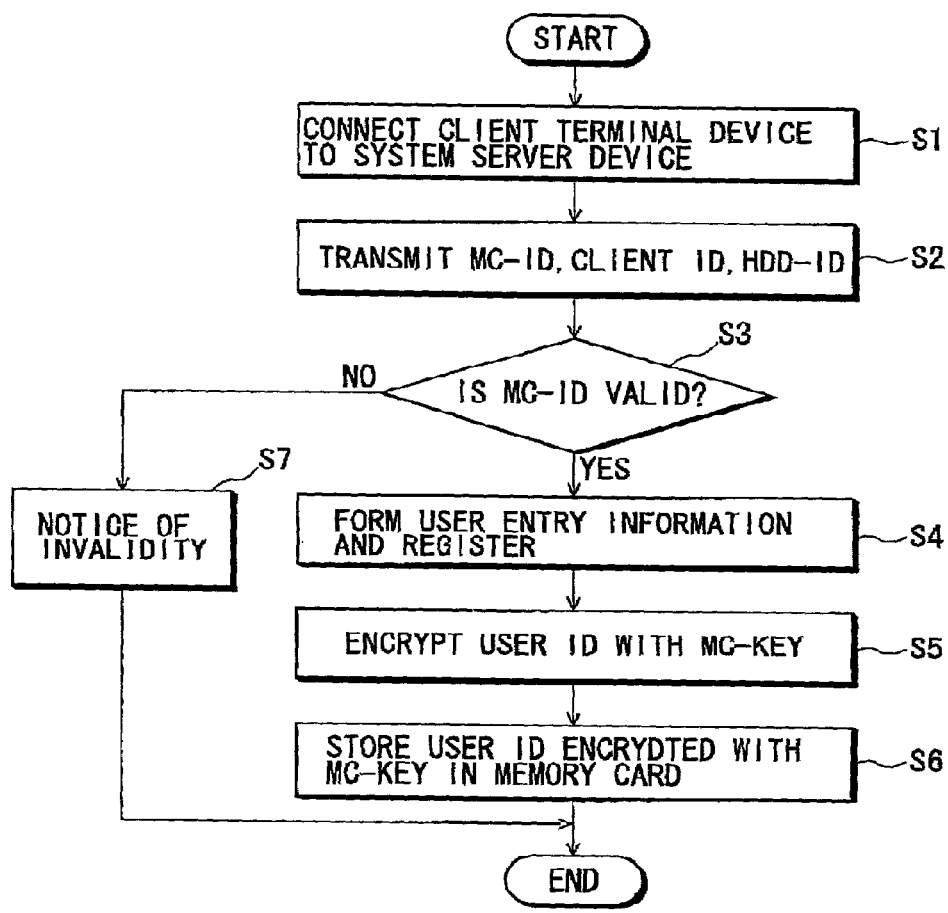
FIG. 5 is a flowchart illustrating the flow of user registration in a copy management system.
Figure 6:
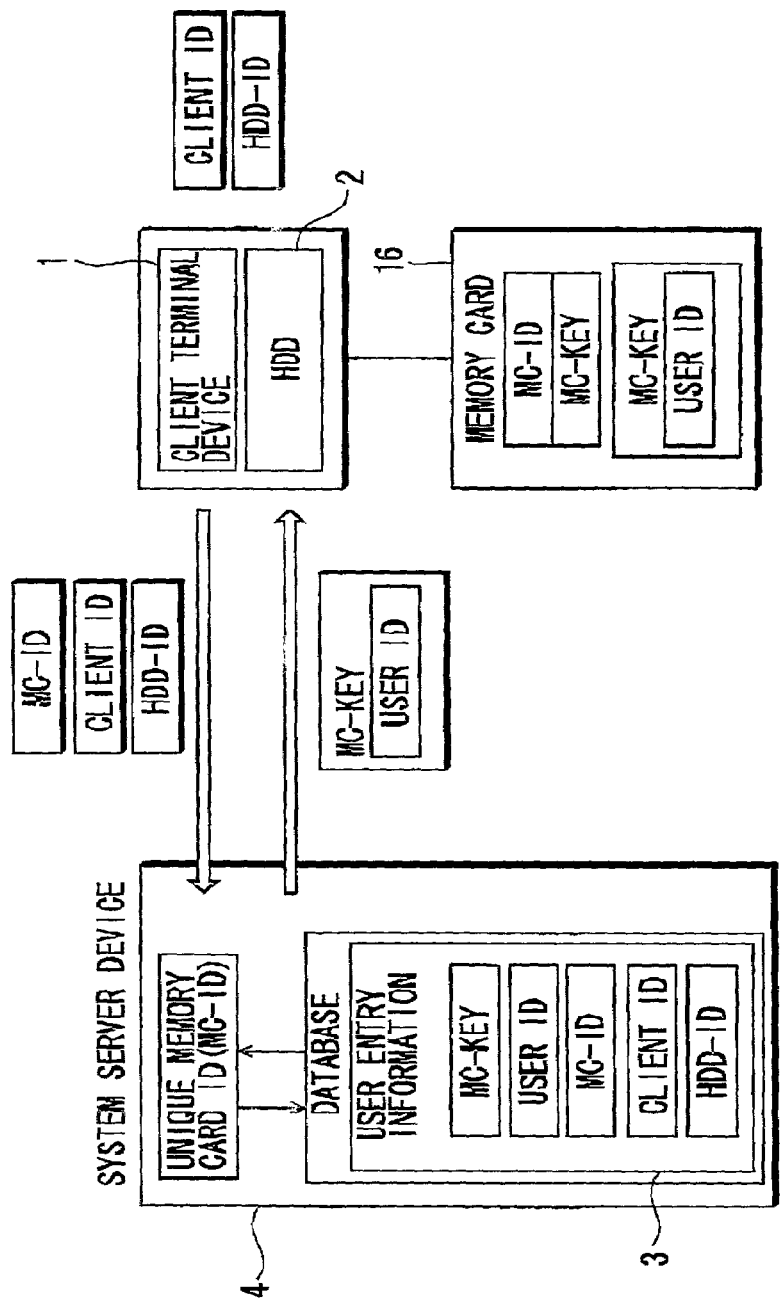
FIG. 6 is a schematic view of a copy management system showing each data sent/received between a client terminal device and a system server device during user registrations

FIG. 5 is a flowchart showing the flow up to when the user performs user registration in system server device 4. FIG. 6 is a schematic view of said copy management system showing each data sent/received between client terminal device 1 and system server device 4 through this user registration.

A user registration procedure is described forthwith using this FIG. 5 and FIG. 6. The flowchart in FIG. 5 starts with the user turning on the main power of client terminal device 1.

In Step S1, the user connects his/her client terminal device 1 to system server device 4 via the Internet 5.

More specifically, an Internet-connecting communications modem 6 is connected to (or internally mounted in) this client terminal device 1 as shown in FIG. 1. Once the user has designated Internet connection, CPU 30, which is shown in FIG. 3, operates based on a predetermined (world wide) web browser, and establishes a communication link between said client terminal device 1 and system server device 4 via this communications modem 6. This allows the user registration procedure to proceed to Step S2.

In Step S2, CPU 30 transmits the identification number of the memory card loaded into client terminal device 1 (MC-ID), the identification number uniquely attached to each client terminal device 1 (Client ID), and the identification number uniquely attached to each HDD 2 (HDD-ID) to system server device 4.

More specifically, once a communication link has been established between system server device 4 and client terminal device 1, CPU 30 communicates, respectively, with client terminal device 1, HDD 2, and memory card 16. Through this communication, CPU 30 obtains, respectively, the identification number uniquely attached to client terminal device 1 (Client ID), the identification number uniquely attached to HDD 2 (HDD-ID), and the identification number uniquely attached to memory card is (MC-ID), which is loaded in client terminal device 1. CPU 30 transmits these identification numbers to the system server device 4 side as shown in FIG. 6. With this, the user registration procedure proceeds to Step S3.

It is noted that data transmitted/received between client terminal device 1 and system server device 4 is encrypted based on a communication protocol such as Secure Sockets Layer (SSL) to maintain secure communications.

In addition, in this example, CPU 30 obtains the Client ID, HDD-ID and MC-ID by communicating with each device and transmits them to the system server device 4 side. However, the Client ID, HDD-ID, and MC-ID are labeled on each of the respective casings of client terminal device 1, HDD 2, and memory card 16 in a manner allowing them to be visible to the user. As a result, the user may look at the client ID, HDD-ID and MC-ID, manipulate controller 14 to manually input each ID, and transmits it to the system server device 4 side.

Next, in Step S3, system server device 4 determines whether the identification number of the memory card (MC-ID) transmitted from the user is a valid ID. In this Step S3, if system server device 4 determines that the MC-ID transmitted by the user is a valid ID, the user registration procedure proceeds to Step S4; if it determines that the MC-ID transmitted by the user is an invalid ID, the user registration procedure proceeds to Step S7.

More specifically, system server device 4 comprises database 3, in which the Client IDs for all client terminal device 1, the HDD-IDs for all HDDs 2, and the MC-IDs for all memory cards 16 are stored.

Upon transmission of each unique ID for client terminal device 1, HDD 2, and memory card 16 from the user, system server device 4 first verifies the MC-ID transmitted from the user as the unique ID of memory card 16 against each MC-ID registered in database 3, and determines whether the same MC-ID as the MC-ID of memory card 16 transmitted from the user is registered in database 3.

Namely, system server device 4 determines whether the MC-ID of memory card 16 transmitted from the user is the same as an MC-ID duly registered in database 3.

In the case where the MC-ID of memory card 16 that was transmitted from the user does not match any of the MC-IDS duly registered in database 3, system server device 4 determines that this user registration access is an unauthorized user registration access. In this case, in Step S7, system server device 4 responds by transmitting a message rejecting the user registration such as "USER REGISTRATION CANNOT BE COMPLETED WITH THIS MEMORY CARD" (notice of invalidity) to the client terminal device 1 side. With this, the user registration is terminated ending the user registration procedure.

Otherwise, in the case where the MC-ID of memory card 16 transmitted from the user matches one of the MC-IDs duly registered in database 3, in Step S4, system server device 4 forms a User ID, which is an ID unique to the user currently accessing system server device 4, for example using random numbers.

System server device 4 then, as shown in FIG. 6, bundles the client ID, HDD-ID, and MC-ID together with the user ID, which is the ID unique to the user described above, and an MC-Key, which is described later, and registers this as "USER ENTRY INFORMATION" in database 3 of system server device 4.

In this manner, the copy management system of this embodiment identifies and registers in database 3 each user with a combination of the three IDs of each user's client terminal device 1, HDD 2, and memory card 16.

Since it is impossible for the three IDs of client terminal device 1, HDD 2, and memory card 16 to completely match up between different users, user identification and user registration can be reliably performed by performing user registration based on these three IDs. As a result, it is possible to provide stronger prevention against unauthorized copies of content stored in an optical disk described below.

It is noted here that it is also possible for user registration to take place through the transmission of "only the MC-ID", "only the Client ID", "only the HDD-ID", "the MC-ID and Client ID", "the MC-ID and HDD-ID", or "the Client ID and HDD-ID" to the system server device 4 side. In these cases as well, user identification and user registration can be, for the most part, reliably performed without duplication among different users since each ID is a respectively unique ID.

Next, as the user registration procedure proceeds to Step S5, as a sign that user registration has been duly completed, system server device 4 encrypts the User ID within the user entry information formed in the above-mentioned Step S4 with the MC-Key and returns it to the client terminal device 1 side.

MC-Key

The above-mentioned "MC-Key" is key information for encrypting data transmitted/received between client terminal device 1 and system server device 4. This MC-Key is pre-stored within memory card 16 together with the MC-ID.

The MC-ID is labeled on the casing of memory card 16 in a manner allowing it to be visible to the user; however, this MC-Key is stored inside memory card 16 so as to not be visible to the user. In addition, this MC-Key is made to be highly confidential information so that there is no chance of it being displayed or output even in cases where the user reproduces information stored memory card 16. Therefore, this MC-Key, at the user level at lease, is made unrecognizable.

In addition, the MC-Keys stored in each of the respective memory cards 16, together with the MC-IDs of all of the memory cards 16 are stored in database 3 of system server device 4. When the MC-Key is needed, system server device 4 reads out and references the MC-Key from this database 3. Therefore, this MC-Key never be transmitted from client terminal device 1 to system server device 4.

In this manner, the MC-Key is made into highly confidential information that is not recognizable at the user level and further is not transmitted/received between client terminal device 1 and system server device 4.

Since transmission/reception of the MC-Key between client terminal device 1 and system server device 4 is made unnecessary, problems such as third-party interception of the MC-Key can be prevented.

When the user ID is to be returned, system server device 4 selects the MC-Key which corresponds to the currently-accessed user's memory card 16 from the MC-Keys pre-stored in database 3. The User ID is then encrypted using this selected MC-Key and returned to client terminal device 1.

This MC-Key is then used when respectively decrypting the above-mentioned User ID, Media Unique ID (MID), Content-Key, and Content-Gen-Key.

The MID is an ID uniquely attached to each individual optical disk. The Content-Key is an encryption key used when subjecting content stored in an optical disk to encryption processing. The Content-Gen-Key is an encryption key used when employing re-encryption on content to be copied to HDD 2.

Using the Content-Key mentioned above, client terminal device 1 decrypts content reproduced from the optical disk. Then using the Content-Gen-Key mentioned above, client terminal device 1 subjects the decrypted content to re-encryption processing and copies it to HDD 2. This will be described in more detail later.

Next the user registration procedure proceeds to Step 36, wherein client terminal device 1 stores the User ID returned from the system server device 4 side into memory card 16. Through this, the user registration procedure shown by the flowchart in FIG. 5 is completed. At this point, the user ID encrypted with the MC-Key, together with the MC-ID and the MC-Key pre-stored as shown in FIG. 6, are all stored in memory card 16.

Registration of Media Unique ID and Acquisition of Content

Next, if it is possible to copy the content stored in the optical disk to HDD 2 as many times, then by merely lending the memory card 16 stored with the MC-ID, MC-Key and User ID to another user, this other user would also become able to copy in an unauthorized manner the content stored in the optical disk onto his/her HDD, which is undesirable.

In the case of this copy management system, when the content is to be copied to HDD 2, the user transmits the Media Unique ID (MID) uniquely attached to each individual optical disk to the system server device 4 side via client terminal device 1. Together with registering the MID transmitted by the user, system server device 4 transmits the Content-Key for decrypting the encrypted contents to the user. Client terminal device 1 decrypts the content stored in the optical disk and copies it to HDD 2. Accordingly, the fact that this Content-Key has been received means that content copy has been licensed for client terminal device 1 from system server device 4.

Upon confirmation that a Content-Key has not been previously sent for the MID received from client terminal device 1, system server device 4 transmits the Content-Key. Through this, transmission of a content-Key to the same MID can be limited to one time only.

Assume, for example, the case where a certain user, after copying contents stored in an optical disk purchased by this user his/herself, lends this optical disk to another user. The other user, when trying to copy the content to HDD 2, transmits the MID of the borrowed optical disk to system server device 4. However, on the system server device 4 side, there is history remaining which shows that a Content-Key for the MID of that optical disk has been already transmitted. In this case, system server device 4 does not distribute a Content-Key to the other user. The other user, unable to acquire a Content-Key, is then not able to copy the content to HDD 2. In such a manner, this copy management system prevents unauthorized content copy.

Figure 7:
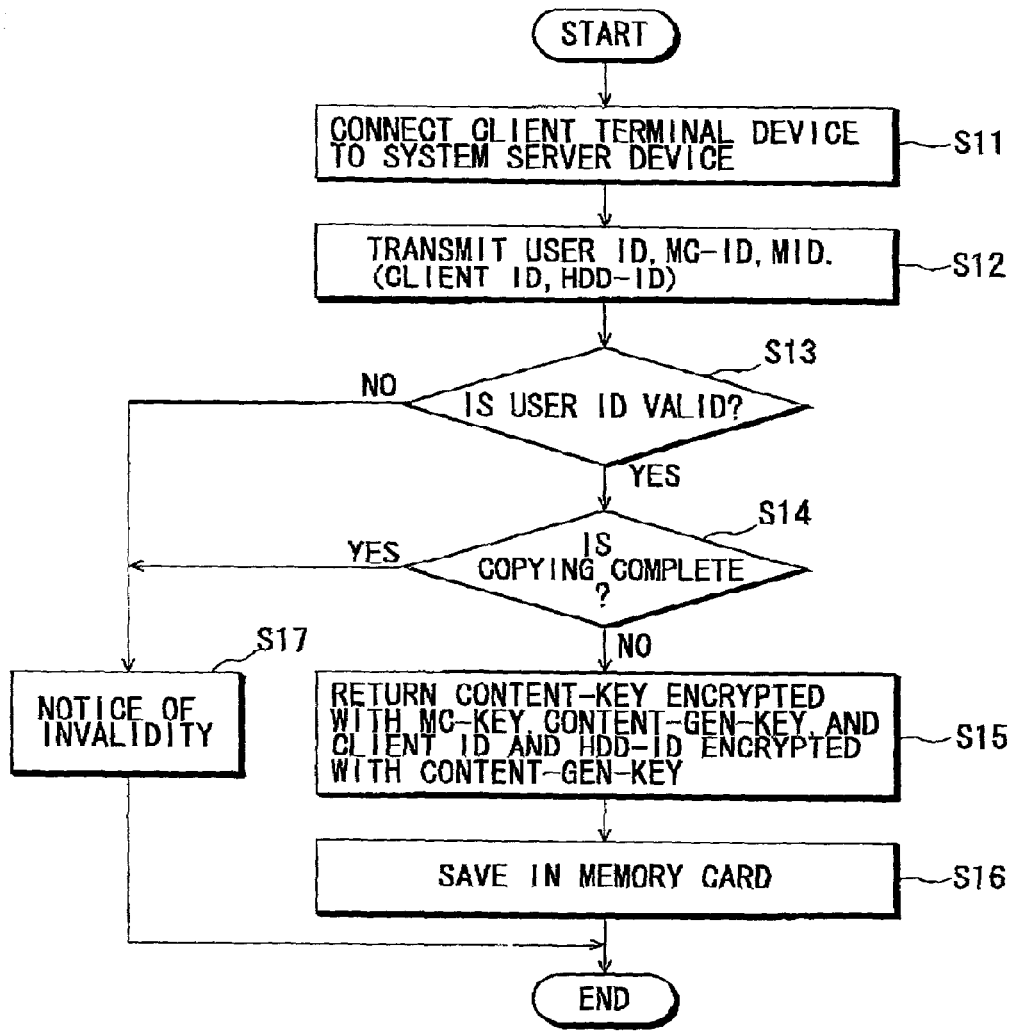
FIG. 7 is a flowchart illustrating registration of a Media Unique ID (MID) included separately in an optical disk and acquisition of a Content-Key in a copy management system.

In the flowchart of FIG. 7, the flow from Media Unique ID (MID) registration to acquisition of the Content-Key by a user is shown. In addition, each piece of information transmitted/received between client terminal device 1 and system server device 4 during MID registration and Content-Key acquisition is shown in FIG. 8.

Figure 8:
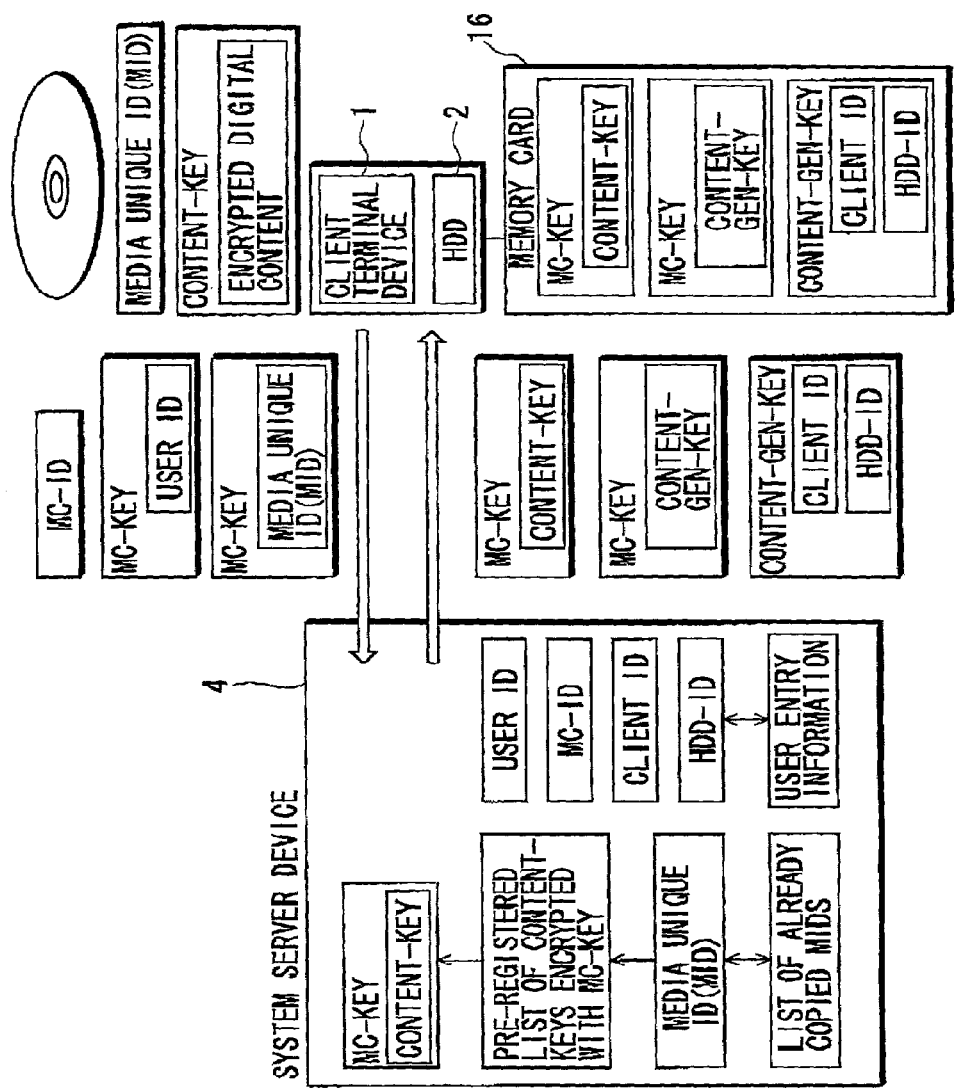
FIG. 8 is a schematic diagram of a copy management system showing each piece of information sent/received between a client terminal device and a system server device during registration of an MID included separately with an optical disk and acquisition of a Content-Key.

Using FIG. 7 and FIG. 8, the procedure for MID registration and Content-Key acquisition is described forthwith. The procedure for MID registration and Content-Key acquisition (registration/acquisition procedure) shown in FIG. 7 is executed on the premise that the user has duly finished user registration as described earlier.

To begin with, in Step S11, client terminal device 1 establishes a communication link with system server device 4. Afterward, the registration/acquisition procedure proceeds to Step S12.

It is noted that in this example it is described that, after the user registration described earlier has finished, the communication link established between client terminal device 1 and system server device 4 is temporarily terminated, then during execution of this registration/acquisition procedure, the communication link is once again established between client terminal device 1 and system server device 4.

Alternatively, it is also possible to execute this registration/acquisition procedure in continuation with the user registration described above without terminating the communication link established between client terminal device 1 and system server device 4. In this case, this registration/acquisition procedure skips Step S11 and proceeds to Step S12 from START.

Next in Step S12, client terminal device 1 transmits the User ID and MC-ID acquired in the manner described earlier to system server device 4. In addition, client terminal device 1 transmits to the system server device 4 side the MID uniquely attached to the optical disk stored with the contents that are to be copied forthwith to HDD 2, together with this user ID and MC-ID.

More specifically, CPU 30 communicates with memory card 16 and transmits the MC-ID to the system server device 4 side in the manner shown in FIG. 8. In addition, CPU 30 reads out from memory card 16 the User ID encrypted with the MC-Key in the manner described earlier and transmits it to the system server device 4 side. In addition, CPU 30 encrypts the MID reproduced from the optical disk by controlling optical disk controller 33 and transmits this to the system server device 4 side.

It as noted that the Client ID and HDD-ID may also be sent together with each of these pieces of information to the system server device 4 side. The Client ID and HDD-ID can be used together with the above-mentioned MC-ID to Identify the user. By identifying the user using these three IDs, the MC-ID, Client ID and HDD-ID, a more accurate identification of the user can take place than when only the MC-ID is used to perform user identification Information to be transmitted/received between client terminal device 1 and system server device 4 in encrypted and transmitted/received based on a transmission protocol such as Secure Sockets Layer (SSL). Through this, communications having a high level of security can be performed between client terminal device 1 and system server device 4.

Next, in Step S13, system server device 4 determines whether or not the User ID transmitted from the client terminal device 1 side is a valid ID. In this Step S13, if system server device 4 determines that the User ID is valid, this registration/acquisition procedure proceeds to Step S14. Otherwise, if in this Step S13 system server device 4 determines that the User ID is invalid, this registration/ acquisition procedure proceeds to Step S17.

More specifically, system server device 4 references database 3 based on the MC-ID (and Client ID and HDD-ID) received from the client terminal device 1 side and reads out the MC-Key corresponding to this MC-ID. Based on this MC-Key, system server device 4 respectively decrypts User ID and MID that is encrypted with the MC-Key and sent.

As described earlier, database 3 on the system server device 4 side is stored with, for example, the User ID, MC-ID, Client ID, and HDD-ID as user entry information. As a result, system server device 4 retrieves user information within database 3 based on the MC-ID (and Client ID and HDD-ID). System server device 4 then verifies the User ID within this user information with the User ID of the user currently accessing the system server device 4 side.

In the case where both of these match, system server device 4 determines that the user currently accessing the system server device 4 side is an authorized user. With this, the registration/acquisition procedure proceeds to Step S14.

On the other hand, when the User ID within this user information in database 3 does not match the User ID of the user currently accessing the system server device 4 wide, system server device 4 determines that User ID to be invalid. Then, in Step S7, system server device 4 respond by transmitting a message prompting user registration to be performed again such as "USER ID INVALID. PLEASE COMPLETE USER REGISTRATION." (notice of invalidity) to the client terminal device 1 side. With this, the registration/acquisition procedure is terminated and ended.

Next, in Step S14, system server device 4 determines whether the content stored in the optical disk of the user currently accessing it has a history of being copied in the past.

More specifically, in the case of this copy management system, all of the MIDs respectively attached to the optical disks are stored in database 3. Once the content has been copied, system server device 4 flags the MID in database 3 to leave behind a copy history.

Accordingly, system server device 4 decrypts the MID and detects whether MID has been flagged. With this, it is possible to determine whether content has been copied in the past from the optical disk hating that unique MID.

If that MID has not been flagged, it means that content has not been copied in the past from the optical disk to which that MID is attached. Therefore, system server device 4 flags that MID in database 3. In addition, system server device 4 registers this flagged MID in the user entry information for that user, and the registration/acquisition procedure proceeds to Step S15.

On the other had, if that MID has been flagged, it means that contents have been copied in the past from the optical disk to which that MID is attached. Accordingly, in Step S17, system server device 4 responds by transmitting a message rejecting the user registration such as "CONTENT CANNOT BE COPIED PROM THIS MEDIA" (notice of invalidity) to the client terminal device 1 side. With this, the registration/acquisition procedure is terminated and ended.

If content has not been copied in the past from that user's optical disk, then it proceeds next to step S15. In this case, using the MC-Key of that user's memory card 16, system server device 4 encrypts the Content-key that encrypted the content stored in the optical disk. This encrypted Content-Key is then transmitted to the client terminal device 1 side. The fact that this Content-Key has been transmitted means that copy of the content stored in the optical disk has been licensed for the user from the system server device 4 side.

The MC-Key is uniquely attached to the memory card 16 that user has in his/her possession. Therefore, the only user able to decrypt and use this Content-Key is the user which has the memory card 16 stored with that MC-Key. Accordingly, the above-mentioned Content-Key can only be safely transmitted for an authorized user.

In addition, system server device 4 reads out the Client ID of client terminal device 1 utilized by the user and the HDD-ID of HDD 2 based on the user entry information stored in database 3. System server device 4 encrypts each of these IDs with a "Content-Gen-Key" using, for example, random numbers and returns them to the client terminal device 1 side.

Moreover, system server device 4 encrypts this Content-Gen-Key, which is used when encrypting the Client ID and the HDD-ID, with the MC-Key described above and returns it to the client terminal device 1 side.

As is described later in more detail, client terminal device 1 verifies the Client ID of said client terminal device 1 against the Client ID returned from system server device 4. In addition, client terminal device 1 verifies the HDD-ID of HDD 2, which is connected to said client terminal device 1, against the HDD-ID returned from system server device 4. Then client terminal device 1 verifies that the above-mentioned two Client IDs and the above-mentioned two HDD-IDs respectively mach and begins to copy the content.

Therefore, by returning a pre-registered Client ID and HDD-ID for client terminal device 1 from system server device 4, content copy can be made possible only with the combination of the user's client terminal device 1 and HDD 2 that have already been registered in database 3.

Moreover, system server device 4 encrypts the Content-Gen-Key, which encrypted the Client ID and the HDD-ID, using the MC-Key uniquely attached to memory card 16 held by the user and returns it to the user's client terminal device 1. Therefore, the only user able to decrypt and use this Content-Gen-Key is the user having the memory card 16 stored with that MC-Key. Accordingly, the above-mentioned Content-Gen-Key can only be safely transmitted for an authorized user.

Next in Step S16, client terminal device 1 respectively stores the Content-Key encrypted by the MC-Key returned from the system server device 4 side, the Content-Gen Key encrypted by the MC-Key, and the Client ID and HDD-ID encrypted by the content-Gen-Key in memory card 16. With this, the registration/acquisition procedure shown in the flowchart of FIG. 7 is completed.

In this manner, this copy management system permits copy of content stored in an optical disk having an MID with no past history of being copied. Through this, copy of content stored in each optical disk is limited to one time only. Therefore a third party who has borrowed the optical disk stored with contents that have already been copied cannot copy content from that borrowed optical disk. Accordingly, unauthorized copying of content by many users from one optical disk can be prevented.

Content Copying

Next, the user is allowed to copy the content stored in the optical disk to HDD 2 by acquiring this Content-Key.

Figure 9:
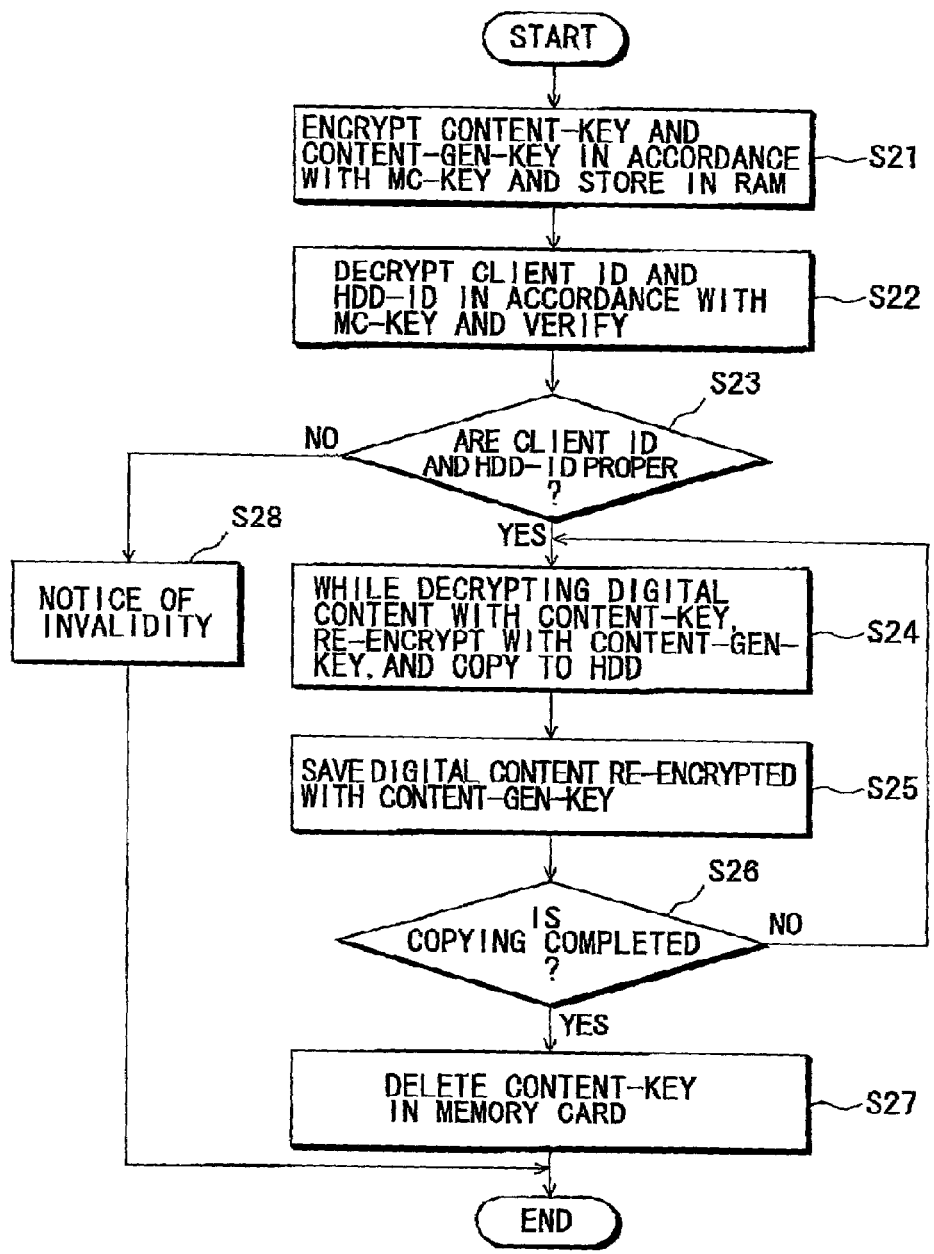
FIG. 9 is a flowchart illustrating the flow during copying in the copy management system.
Figure 10:
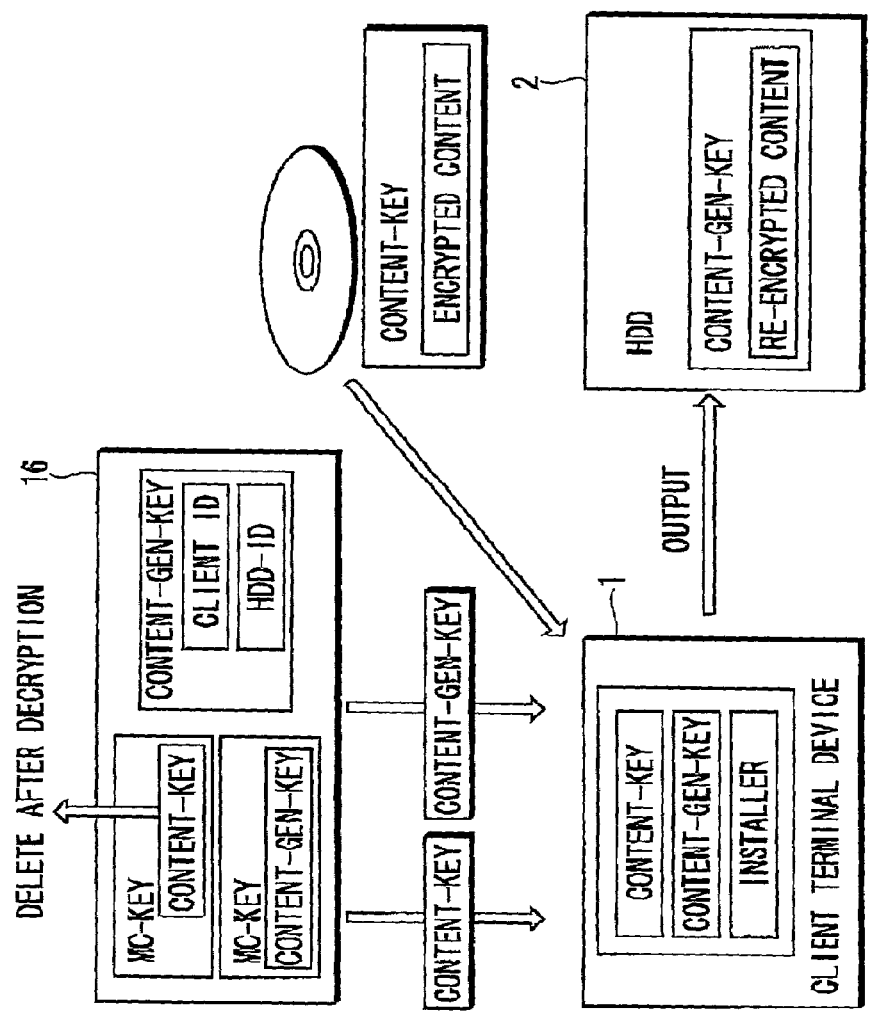
FIG 10 is a schematic diagram showing each piece of information sent/received between a client terminal device, a memory card, and an HDD during copying.

FIG. 9 is a flowchart showing the flow of this copying procedure and FIG. 10 is a diagram schematically illustrating information handled among client terminal device 1, HDD 2 and memory card 16 when this content is copied. A copying procedure is described forthwith using this FIG. 9 and FIG. 10.

To begin with, the flowchart in FIG. 9, starts at the point where MID registration described earlier is completed, and a user who has acquired a Content-Key designates content copying by manipulating client terminal device 1.

In Step S21, the IOP 32 of client terminal device 1 read out from memory card 16 the Content-Key and Content-Gen-Key, which are respectively encrypted with the MC-Key, and supplies them to CPU 30.

As described earlier, the MC-Key is respectively retained in system server device 4 and client terminal device 1. Therefore, CPU 30 Subjects the above-mentioned encrypted Content-Key and Content-Gen-Key to decryption processing using this retained MC-Key CPU 30 then stores this encrypted Content-Key and Content-Gen-Key in RAM 36. With this, the copy procedure proceeds to Step S22.

In Step S22, IOP 32 reads out the Client ID and HDD-ID, which are respectively encrypted with the Content-Gen-Key, and supplies them to CPU 30. CPU 30 decrypts the Client ID and HDD-ID using the earlier decrypted Content-Gen-Key.

In addition, in this step S22, CPU 30 verifies the above-mentioned decrypted Client ID with the Client ID attached to client terminal device 1. In addition, CPU 30 verifies the above-mentioned decrypted HDD-ID against the HDD-ID of HDD 2 connected to client terminal device 1.

Next, in Step S23, CPU 30 determines whether or not each of the above-mentioned Client IDs and the each of the above-mentioned HDD-IDs respectively match. If both match, then it means that the contents should be copied go the copy procedure proceeds to Step S24. If both do not match, the copy procedure proceeds to Step S28.

If the client ID and HDD-ID decrypted from memory card 16 do not match the Client ID and HDD-ID of client terminal device 1, it means that the Content ID acquisition described earlier did not take place based on the client terminal device 1 and HDD 2 of the authorized user.

More specifically, in this case, it shows that an unauthorized user was lent memory card 16 from the authorized user, and is trying to copy content.

Accordingly, CPU 30 displays a content copy rejection message such as "COPY IS NOT PERMITTED" to the user. With this, the copy procedure is terminated and ended.

Next, Step S24 is the step executed if client terminal device 1 has detected a match between each of the above-mentioned client IDs and each of the above-mentioned HDD-IDs, respectively. In this case, using the Content-Key stored in RAM 36, CPU 30 decrypts the content reproduced from the optical dick by optical disk controller 33. In addition, using the Content-Gen-Key stored in RAM 36, CPU 30 subjects the decrypted content to re-encryption processing and supplies it to HDD 2.

Next, in Step S25, HDD 2 saves (copies) the content re-encrypted with the above mentioned Content-Gen-Key as shown in FIG. 10.

Next, in Step S26, CPU 30 of client terminal device 1 communicates with HDD 2 to determine whether or not copying of the contents has been completed. If copying has not been completed, CPU 30 repeatedly executes the operations in Step S24 and Step 25 described earlier to supply content to HDD 2 until copying of the content has been completed once the copying of content has been completed, the copy procedure proceeds to Step S27.

In Step S27, since the copying of content has been completed, IOP 32 deletes the Content-Key stored in memory card 16. With this, the copy procedure ends.

In this manner, client terminal device 1 decrypts with the Content-Key issued from system server device 4 the content stored in the optical disk that has been encrypted with a Content Key, and copies it to HDD 2. Then after this content has been copied, the Content-Key stored within memory card 16 (the Content-Key issued from system server device 4) is deleted.

As described earlier, since a copy history remains in database 3 for the optical disk to which content has already been copied, in principle, system server device 4 will not re-issue a Content-Key. Therefore a copy request from a third party who has borrowed an optical disk stored with contents that have been copied once will be rejected by system server device 4 based on the copy history remaining in the above-mentioned database. Therefore system server device 4 will not transmit the Content-Key to this third party.

Since the above-mentioned third party is not able to acquire the Content-Key, he/she will not be able to decrypt the content stored on the borrowed disk. Accordingly, even if the above-mentioned third party is able to copy the content onto a secondary storage media such as a HDD, such content cannot be used since he/she is not able to decrypt such contents. Accordingly, this copy management system is able to prevent unauthorized use of content.

Reproduction of Copied Content

Next, content copied in this manner to HDD 2 can be repeatedly reproduced and used by the user.

Figure 11:
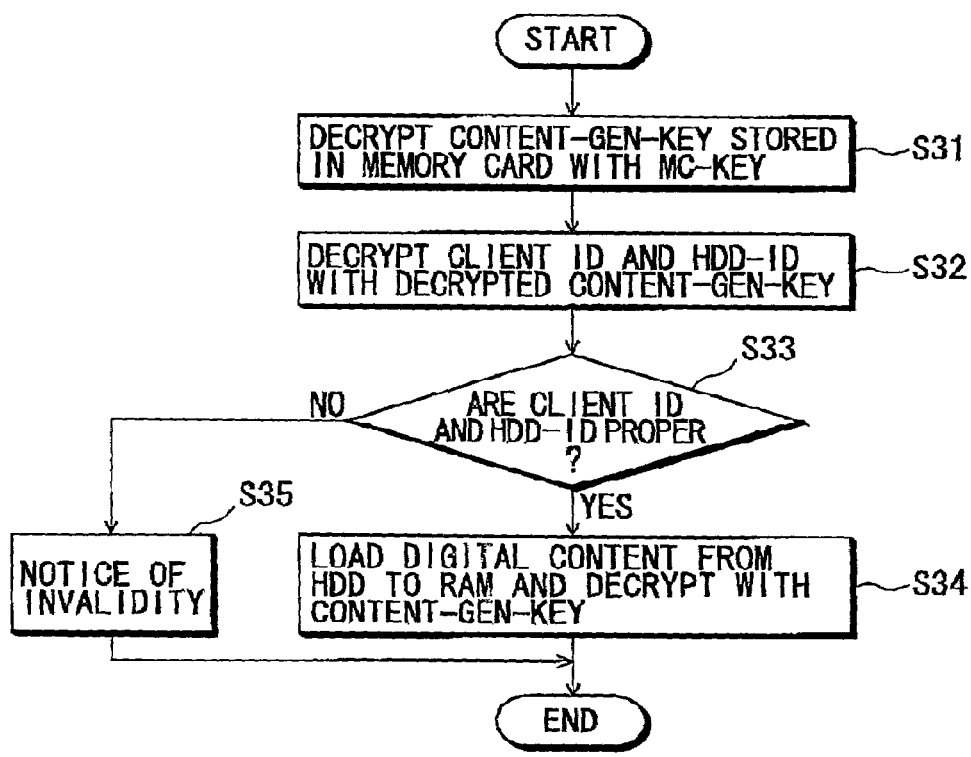
FIG. 11 is a flowchart illustrating the reproducing operation for contents copied to the HDD in a copy management system.
Figure 12:
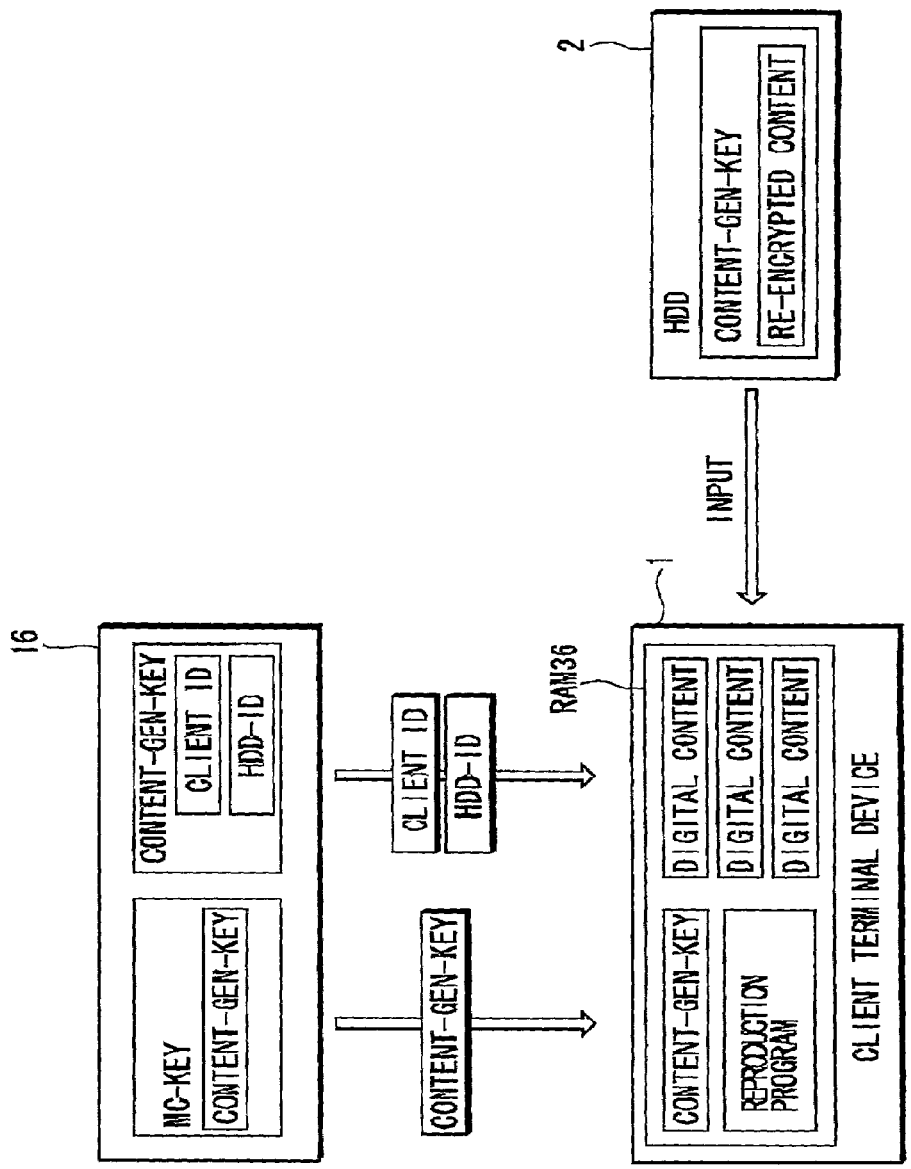
FIG. 12 is a schematic diagram showing information sent/received between a client terminal device, a memory card, and an HDD during reproducing of contents copied to an HDD.

FIG. 11 shows a flowchart illustrating the flow of a reproducing procedure for content stored on HDD 2. In addition, FIG. 12 shows a schematic diagram of information handled among client terminal device 1, HDD 2, and memory card during this reproducing procedure.

The flowchart in FIG. 11 starts at the point where a user who has duly completed copying of content as described earlier specifies reproduction of content.

In Step S31, the IOP 32 of client terminal device 1 reads out the Content-Gen-Key, which is encrypted with the MC-Key described above, from memory card 16 and supplies it to CPU 30. CPU 30 then decrypts and reproduces this Content-Gen-Key using the MC-Key saved on the client terminal device 1 side.

In Step S32, IOP 32 reads out the Client ID and HDD-ID, which are respectively encrypted with the Content-Gen-Key, from memory card 16 and supplies them to CPU 30. CPU 30 decrypts the Client ID and HDD-ID using the earlier decrypted Content-Gen-Key.

Next, in this Step S33, CPU 30 verifies the Client ID decrypted with the above-mentioned Content-Gen-Key, against the client ID attached to client terminal device 1. In addition, CPU 30 verifies the HDD-ID decrypted with above-mentioned Content-Gen-Key, against the HDD-ID of HDD 2 connected to client terminal device 1.

If each of the above-mentioned Client IDs and each of the above-mentioned HDD-IDs do not respectively match, it shows that another user's memory card 16, another user's client terminal device 1, or another user's HDD 2 is being used. Accordingly, in Step S35, CPU 30 displays a content reproducing rejection message such as "CONTENT REPRODUCTION IS NOT PERMITTED" to the user. With this, the reproducing procedure is terminated and ended.

In this manner, with this copy management system, even when content copied to HDD 2 is reproduced, the Client ID and HDD-ID are verified. For example, consider the case where an authorized user held memory card 16 and HDD 2 in which content is saved are lent to a third party. Assume that the third party connects the borrowed memory card 16 and HDD 2 to his/her own client terminal device and tries to playback contents stored within that HDD 2.

However, the Client ID stored within memory card 1s is the Client ID is that of the authorized user. As a result, since the Client ID of the third party client terminal device and the Client ID stored in memory card 16 do not match, reproduction of content stored in HDD 2 is rejected for the third party client terminal device. Accordingly, use of content copied to HDD 2 can be prevented in the case where memory card 16 and HDD 2 are lent out.

Next, in the case where each of the above-mentioned Client IDs and each of the above-mentioned HDD-IDs respectively match, CPU 30 decrypts the content in HDD 2 using the Content-Gen-Key decrypted earlier, and stores this in RAM 36. With this, the reproducing procedure ends.

In the case where the content stored in RAM 36 is, for example, game content of a video game, CPU 30 operates in accordance with this game content. CPU 30 then displays, for example, a character in the video game, and produces the effect music, BGM music, etc. Thus, the user is able to enjoy the video game based on the game content copied to HDD 2 from the optical disk.

In the case where the video game is to be played by reproducing game content directly from the optical disk, optical disk loading must be performed each time a new video game is played. However, by copying the game content stored in the optical disk to HDD 2 in this manner, it is possible to eliminate the optical disk loading that was necessary each time a user wanted to play a new video game. Thus it is possible to start up a new video game smoothly.

It is noted that after the content has been copied from the optical disk, since the Content-Key stored in memory card 16 is deleted, the content cannot be copied again. However, the Content-Gen-Key stored in memory card 16 is not deleted after copying has finished. Accordingly, it is possible to repeatedly play content encrypted with the Content-Gen-Key and copied to HDD 2 by re-decrypting it using the Content-Gen-Key stored in memory card 16.

Accommodation for Device Repair/Exchange

With this copy management system, system server device 4 maintains, for example, the Client ID, HDD-ID, and MC-ID (hereinafter referred to collectively as the Device ID) as well as the User ID collectively as user entry information However, in the case where a device such as client terminal device 1 or HDD 2 is exchanged due to damage, etc., the Device ID of this exchanged device is different from the Device ID registered as the user entry information. Accordingly, if a device is exchanged, although the user may be authorized, there is fear that copy or reproduction of the content using that exchanged device will become impossible.

On the other hand, this copy management system aims to prevent unauthorized use of content by maintaining the uniqueness of the Device ID. Therefore, even in the case where the device such as client terminal device 1 or HDD 2 is repaired and restored to its original state, a new Device ID, which differs from the Device ID attached before repair, is attached to the device after repair, so it is desirable for there to be a way to maintain these IDS while reliably distinguishing between a pre-repair device and a post-repair device.

However, if a Device ID is attached to a post-repair device in this manner, as with an exchanged device as mentioned above, although the user may be authorized, there is fear that copy or reproduction of the content using that repaired device will become impossible.

This copy management system prevents in the following manner the inconvenience mentioned above where it is feared a new Device ID will be used due to device repair or exchange.

Accommodation for Client Terminal Device and HDD Repair/Exchange

Figure 13:
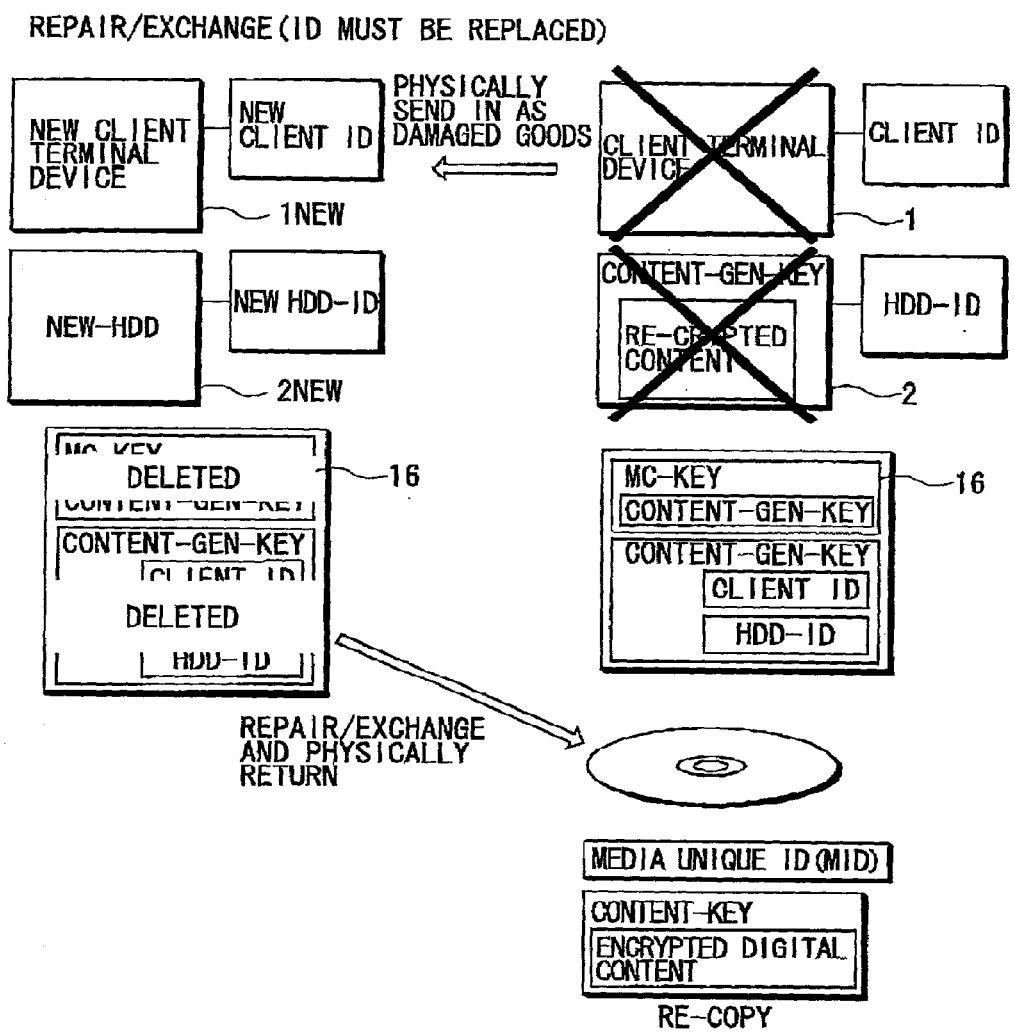
FIG. 13 is a schematic diagram for describing accommodation of repair or replacement or a client terminal device or HDD by a copy management system.

FIG. 13 shows a schematic diagram for describing accommodation for exchange/repair of a client terminal device and HDD in this copy management system. In FIG. 13, client terminal device 1 and HDD 2 with the "X" drawn thereon are damaged devices.

In FIG. 13, when a device is damaged, the user sends the damaged device together with memory card 16 to a repair center on the administrator side, which manages this copy management system.

Even though in this case memory card 16 is not damaged, the Content-Gen-Key, and the Client ID and HDD ID encrypted with the Content-Gen-Key are stored in memory card 16. Therefore, even in the case where it is the device that is damaged, memory card 16 should be sent (or brought) in the above-mentioned repair center together with the damaged device.

At the repair center, once the malfunctioning device is sent in, together with repairing/exchanging this device so that it operates regularly, a new Device ID is attached to the repaired/exchanged device.

More specifically, the Client ID of client terminal device 1 is stored in MASK-ROM 35 with the above-mentioned Hardware ID and the operating system program. In addition, a MASK-ROM similar to the above-mentioned MASK-ROM 35 is also provided within HDD 2, and the HDD-ID is stored in this MASK-ROM. As a result, at the repair center, in the case where the device is repaired, the MASK-ROM provided before repairs are done is removed and by exchanging it with a MASK-ROM stored with a new client ID or HDD-ID, a new client ID or HDD-ID is attached.

It is noted that in the case where the device itself is exchanged with a new device, since a Device ID differing from that of the damaged device is stored in the MASK-ROM of this new device, repair-time exchange of the MASK-ROM is not performed such as was described above.

Next, an operator at the repair center reproduces the MC-ID of the memory card 16 sent in with the damaged device. The operator accesses the above-mentioned database 3 of system server device 4 via a terminal device provided in the repair center, and based on the MC-ID reproduced from the above-mentioned memory card 16, references the user entry information stored in the above-mentioned database 3. The operator then operates the terminal device to perform repair registration of the newly attached Device ID into the Device ID of the user entry information stored in database 3. In addition, the operator manipulates database 3 via the terminal device and remove the flags of the copied contents.

In addition, the operator operates the terminal device to delete the Content-Gen-Key encrypted with the MC-Key, and the Device ID (Client ID and HDD-ID) encrypted with the Content-Gen-Key, which are both stored within memory card 16. This memory card 16 is then sent (handed) back to the user together with the repaired/exchanged device.

Thus, the state of the (client terminal device 1, HDD 2 and memory card 16) device then is thereby returned to the state immediately after ending the user registration procedure described using FIG. 5 and FIG. 6 (which is the same as the state immediately before copying the content).

The user to whom this memory card 16 and device are sent back then operates client terminal device 1 so as to once again perform registration of the Media Unique ID (MID) and acquisition of a Content-Key, which were described in FIG. 7 and FIG. 8

Client terminal device 1 accesses system server 4 according to its operation by the user, and performs MID registration. Client terminal device 1 once again copies to HDD 2 the content stored in the optical disk using the content key issued from system server device 4 through this registration.

With this, even in the case where a device is newly attached to a device due to repair/exchange of the device, as long as the user is authorized, it is possible to execute copy or reproduction of content based on the new Device ID.

In addition, on the copy management system side, by the attachment of a new Device ID to a device restored to its original state through repair or exchange, a pre-repair device and a post-repair device can be reliably distinguished.

Accommodation for Memory Card Damage/Loss

Figure 14:
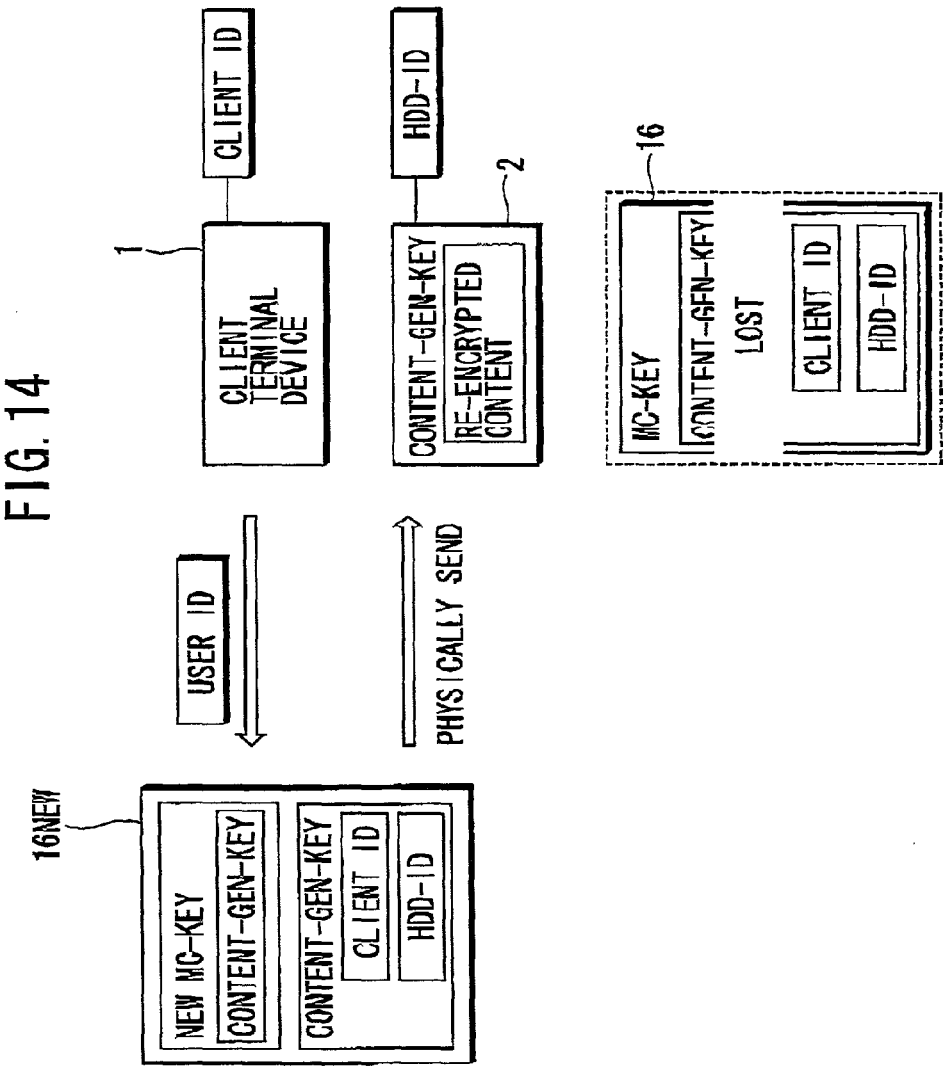
FIG. 14 is a schematic diagram for describing accommodation of damage or loss of a memory card by a copy management system.

This copy management system handles damage or loss of memory card 16 in the following manner. FIG. 14 shows a schematic diagram for describing accommodation for damage/loss of memory card 16 in this copy management system. In FIG. 14, the memory card 16 shown within the dashed-line frame is the damaged or lost memory card 16.

In the case where memory Card 36 has been damaged or lost, as shown in FIG. 14, the user connects client terminal device 1 to system server device 4 via the Internet 5, and sends a request for reissuance of a memory card to system server device 4.

Once this request has been made, system server device 4 sends user ID input screen data to the client terminal device 1 side Through this, the user's client terminal device 1 displays the User ID input screen on television receiver 18.

The user then inputs his/her User ID on this input screen. However, in this case, since memory card 16 is damaged or lost, the User ID cannot be read out from memory card 16. Therefore, the user must enter the User ID that, for example, he/she wrote down on a memo pad when the User ID was issued and enter that User ID. System server device 1 sends this input User ID to client terminal device 4.

System server device 4 references the user entry information in database 3 that corresponds to the User ID transmitted by the user. Through this, system server device 4 can recognize the content copied using the Content-Gen-Key and memory card 16, together with the MC-ID and MC-Key of the damaged/lost memory card 16.

Next, system server device 4 registers the new MC-Key (New-MC-Key), the Content-Gen-Key newly encrypted with this New-MC-Key, and the Client ID and HDD-ID encrypted with this Content-Gen-Key for memory card 16new having the new MC-ID. In addition, system server device 4 performs overwriting of the MC-ID and MC-Key so that the user entry information stored in database 3 becomes user entry information that corresponds to this new memory card 16new.

It is noted that in this case memory card 16 has been damaged or lost, but the user's client terminal device 1 and HDD 2 operate as normal. Therefore, the original device ID can be used as is for the Client ID and HDD-ID encrypted by the Content-Gen-Key.

Next, the repair center physically sends this memory card 16new, for example through the post, to the user side. As described earlier, not only is each piece of information within this memory card 16new overwritten, on the system server device 4 side, but the user entry information in database 3 is also overwritten. Accordingly, the user who receives the sent memory card 16new can perform copying of content and playback of the copied content as before using the system comprising a combination of this memory card 16new, client terminal device 1, and HDD 2.

As it has been made clear from the above description, with the copy management system of this first embodiment, a system administrator stores and distributes to a user content to which encryption processing with a Content-Key has been employed, on an optical disk to which a Media Unique ID (MID) has been attached.

The user transmits the MID of the optical disk to system server device 4 when copying the content. In addition, the user transmits the Device ID (Client ID, HDD-ID, MC-ID, etc.) of the device he/she is using to system server device 4.

System server device 4 stores the MID of the optical disk, which has had its content previously copied, in database 3 in connection with the Device ID of the device used by each user. When a request to copy content is made by the user, system server device 4 references database 3 based on the Device ID of the device used by each user and the MID of the optical disk. Provided the same MID has not been registered within database 3, system server device 4 transmits to the user's client terminal device the Content-Key for decrypting the encrypted contents.

Client terminal device 1 decrypts the content stored, in the optical disk using this Content-Key and copies it to HDD 2.

In the case where this copy management system notices an MID that is the same as the MID registered within database 3 and a copy request has been made, the above-mentioned Content-Key is not distributed. Therefore, this copy management system can limit content copying to one time only and can prevent unauthorized content copying.

Second Embodiment

Next, a copy management system of the second embodiment of the present invention is described forthwith. The copy management system of the first embodiment described above performs user registration by having the user connect his/her own client terminal device 1 directly to system server device 4 on the system administrator side, and performs content copying by acquiring, for example, a Content-Key.

With the copy management system of this second embodiment, however, a third party management server device 3, which a third party manages, is provided between the user's client terminal device 1 and the system server device 4 on the system administrator side. The user acquires a Content-Key or the like via this third party management server device. The third party management server device then charges for the provision of this Content-Key or the like.

Configuration of Second Embodiment

Figure 15:
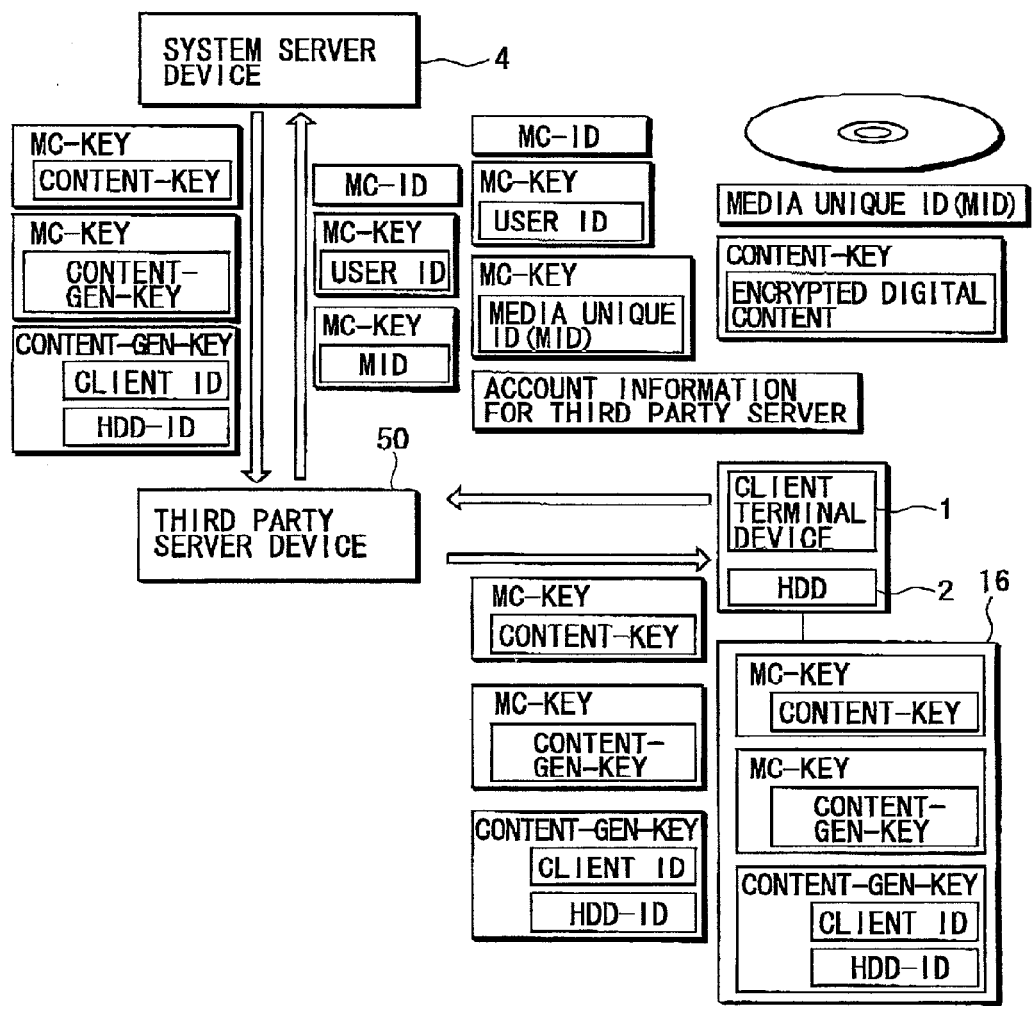
FIG. 15 is a schematic diagram of a copy management system according to the second embodiment of the present invention showing each piece of information sent/received in between a client terminal device and a system server device during registration of an MID included separately in an optical disk and acquisition of a Content-Key.

FIG. 15 shows a system block diagram of a copy management system, which is the second embodiment of the present invention. FIG. 15 shows the flow involved in acquiring a Content-Key when copying content from an optical disk.

In FIG. 15, system server device 4 and third party management server device 50 are connected to each other with, for example, a Virtual Private Network (VPN), which allows a public telephone line to be used as a dedicated line.

In addition, this third party management server device 50 is connected to the Internet 5 without system server device 4 being connected to the Internet 5. Accordingly, the user accesses system server device 4 via this third party management server device 50 instead of being able to access system server device 4 directly.

Operation of Second Embodiment

Next, a copy management system of the second embodiment of the present invention is described forthwith. In the case of the copy management system of this second embodiment, a user attempting to copy content from an optical disk connects his/her own client terminal device 1 to third party management server device 50 via the Internet 5. The user then transmits an MC-ID, User ID and Media Unique ID (MID) to the third party management server device 50 side via client terminal device 1. In addition, the user transmits third party management server device 50 account information (for example User Name and Password) to third party management server device 50 via client terminal device 1.

Client terminal device 1 sends this MC-ID and account information as is to third party management server device 50. In addition, client terminal device 1 encrypts User ID and the MID Of the optical disk with an MC-Key and sends them to third party management server device 50.

Third party management server device 50 extracts so as to acquire account information from each piece of information transmitted from client terminal device 1. In addition, third party management server device 50 transmits the MC-ID, the User ID encrypted with the MC-Key, and the MID encrypted with the MC-Key to system server device 4 via a dedicated line (or the above-mentioned VPN).

Once system server device 4 receives this MC-ID, User ID, and MID, as with that described earlier, it encrypts a Content-Key, which is for decrypting content encrypted in a similar manner as that described earlier and stored in the optical disk, with the MC-Key and returns it to third party management server device 50. In addition, system server device 4 encrypts a Content-Gen-Key with the MC-Key and returns it to third party management server device 50. System server device 4 further encrypts the user's Client ID and HDD-ID with the Content-Gen-Key and returns them to third party management server device 50.

Third party management server device 50 respectively transfers the Content-Key encrypted with the MC-Key, the Content-Gen-Key encrypted with the MC-Key, and the user's Client-ID and HDD-ID encrypted by the Content-Gen-Key to the user's client terminal device 1 via the Internet 5.

Third party management server device 50 charges the user a fee for providing the Content-Key based on the account information for the third party management server device 50 transmitted earlier from client terminal device 1.

Client terminal device 1 stores the Content-Key, Content-Gen-Key, Client ID and HDD-ID transmitted from third party management server device 50 in memory card 16 and uses them, as described earlier, for copying content and reproducing copied content.

On the third party management server device 50 side, for example, the user's credit card number or information relating to a prepaid amount has been pre-registered. Accordingly, third party management server device 50 bills and collects from the credit card company the amount charged for the provision and delivery of the Content-Key. Otherwise, third party management server device 50 deducts the amount of the charge from the prepaid balance.

Monies collected in this manner are distributed in predetermined percentages between, for example, the system server device 4 administrator and the third party management server device 50 administrator.

In this manner, the copy management system of this second embodiment provides a third party management server device 50 between client terminal device 1 and system server device 4. The user requests distribution of a Content-Key by accessing system server device 4 via this third party management server device 50. Third party management server device 50 distributes this Content-Key and charges the user for it.

As a result, in addition to being able to provide a novel copy management system which is a copy management system in which a third party (the third party management server device 50 administrator) intervenes, this copy management system can obtain the same results as the copy management system of the previously described first embodiment.

In addition, with this copy management system, by charging for the content when distributing the Content-Key to the user, content can be distributed to users free of charge via an optical disk or via a predetermined network.

It is noted that in this copy management system, it is also possible for an optical disk to be distributed to a user without an MID being attached, and then when the user requests to copy it, system server device 4 or third party management server device 50 can charge the user for distributing the Content-Key.

In addition, with the copy management system of this second embodiment, third party management server device 50 is set up to carry out the charging; however, it is also possible for system server device 4 to carry out the charging.

Finally, the present invention is not meant to be limited in any way by the embodiments described above by way of example. Accordingly, it is also appended herein that even if there are additional embodiments besides those mentioned above, various modifications thereto according to design and such can be naturally made without deviating from the technical spirit and scope of the present invention.

For example, in the above-mentioned embodiments, client terminal device 1 transmits to system server device 4 client ID, HDD-ID, and MC-ID as device identification information. However, only client ID can be transmitted from client terminal device 1 to system server device 4. As the same, only HDD-ID can be transmitted from client terminal device 1 to system server device 4. Also, as the same, only MC-ID can be transmitted from client terminal device 1 to system server device 4.

Further, client ID together with HDD-ID can be transmitted from client terminal device 1 to system server device 4. As the same, client ID together with MC-ID can be transmitted from client terminal device 1 to system server device 4. Also, as the same, HDD-ID together with MC-ID can be transmitted from client terminal device 1 to system server device 4.

Namely, the above-mentioned copy management system prevents unauthorized copy of the content by managing the storage media stored with the content to be copied in a state of being associated with the device used for copying the content. Therefore, device identification information that is transmitted from client terminal device 1 to system server device 4 should be at least the information user can be specified.

In the above-mentioned embodiments, the memory card 16 is not always necessary. In the case memory card 16 is not used, Content-Key and Content-Gen-Key stored in memory card 16 can be stored in the internal memory of HDD 2 or client terminal device 1.

What is claimed is:

1. A copy management system, comprising:
a storage media, which is stored with predetermined content, and which is attached with unique media identification information;
a user terminal device, which comprises copy means for copying the content stored in the storage media to a first storage device, and which transmits device identification information attached to the user terminal device together with the unique media identification information of the storage media;
a server device, which transmits copy enabling information for enabling copy of content corresponding to the unique media identification information against the user terminal device corresponding to the device identification information when receiving the unique media identification information and device identification information; and
a second storage device disposed on the user terminal device and adapted to be attached to and removed from the user terminal device;
wherein the user terminal device deletes the copy enabling information after copying the content; and
wherein the user terminal device transmits, as the device identification information, at least second device identification information attached uniquely to the second storage device.

2. The copy management system according to claim 1, wherein
the server device transmits the copy enabling information only once against one media identification information.

3. The copy management system according to claim 2, wherein
the user terminal device further transmits, as the device identification information, at least one of terminal device identification information attached a user terminal device body, and first device identification information attached uniquely to the first storage device.

4. The copy management system according to claim 1, wherein
the server device transmits the copy enabling information encrypted by the device identification information, and
the user terminal device decrypts the encrypted copy enabling information with the device identification information.

5. The copy management system according to claim 1, wherein
the server device transmits an encryption key for encrypting the content to be copied;
the user terminal device encrypts the content using the encryption key and copies the encrypted content to the first storage device, stores the encryption key in a predetermined storage means, and decrypts the content copied to the first storage device with the encryption key.

6. The copy management system according to claim 1, wherein
the server device stores as media identification information that transmission of the copy enabling information is complete in a database, in a state of being associated with device identification information attached to each user's user terminal device, and overwrites old device identification information registered in the database with modified device identification information when the device identification information of the user terminal device is modified due to repair or exchange.

7. The copy management system according to claim 1, wherein
the server device performs predetermined charge processing against a user who owns the user terminal device to which transmission of the copy enabling information is performed.

8. The copy management system according to claim 1, further comprising:
intermediating server device, which intermediates in the transmission/reception of information between the user terminal device and the server device, and which performs charge processing for the user at least when copy enabling information is transmitted to the user terminal device.

9. A computer readable storage media, which has been stored with a user terminal device information processing program and media identification information, the information processing program comprising:

a step of reading out media identification information;

a step of reading out device identification information attached to a first storage device that includes the user terminal device used when a user performs copying of content stored in the storage media;

a step of transmitting to a server device at least the read out media identification information and device identification information;

a step of receiving copy enabling information for enabling copying of the content returned from the server device; and a step of copying content stored in the storage media to the first storage device that includes the user terminal device using the received copy enabling information; and a step of deleting the copy enabling information after copying the content;

wherein a second storage device is disposed on the user terminal device and adapted to be attached to and removed from the user terminal device; and wherein the device identification information includes a second device identification number attached uniquely to the second storage device.

10. The computer readable storage media according to claim 9, wherein the copy enabling information is encrypted by the transmitted device identification information, and the information processing program further comprises a step of decrypting the received copy enabling information using the device identification information.

11. The computer readable storage media according to claim 9, further comprising:

a step of receiving an encryption key for encrypting the content to be copied, which is transmitted from the server device;

a step of encrypting with the encryption key the content and copying the encrypted content;

a step of storing the encryption key in a storage means; and a step of decrypting the copied content with the encryption key stored in the storage means.

12. The computer readable storage media according to claim 9, wherein the device identification information is further at least one of terminal device identification information attached to the user terminal device, and the identification information attached uniquely to the first storage device.

13. A user terminal device information processing program to be executed by a computer, comprising:

a step of reading out media identification information from a storage media, the storage media storing predetermined content and having unique media identification information attached;

a step of reading out device identification information attached to a device that includes a user terminal device used when a user performs copying of the content;

a step of transmitting to a server device at least the read-out media identification information and read-out device identification information;

a step of receiving copy enabling information for enabling copying of the content returned form the server device; and a step of copying content stored in the storage media to a first storage device that includes the user terminal device using the received copy enabling information; and a step of deleting the copy enabling information after copying the content;

wherein a second storage device is disposed on the user terminal device and adapted to be attached to and removed from the user terminal device; and wherein the device identification information includes a second device identification number attached uniquely to the second storage device.

14. A copy management method comprising the steps of:

transmitting to a server device device identification information attached to a device that comprises a user terminal device, together with media identification information when copying content stored in a storage media having uniquely attached the media identification information;

detecting by the server device whether the media identification information that is transmitted from the user terminal device is registered in a database registered with media identification information of storage media having the content thereof copied in a state of being associated with corresponding device identification information; and transmitting copy enabling information for enabling copying of the content from the server device to the user terminal device corresponding to the transmitted device identification information when detecting that the media identification information is not registered;

wherein the user terminal device deletes the copy enabling information after copying the content;

wherein the content stored in the storage media is copied to a first storage device;

wherein a second storage device is disposed on the user terminal device and adapted to be attached to and removed from the user terminal device; and wherein the device identification information includes a second device identification number attached uniquely to the second storage device.

15. The computer readable storage media according to claim 9, wherein the information processing program further comprises:

a step of intermediating by a server device in the transmission/reception of information between the user terminal device and the server device; and a step of charge processing by the server device for the user at least when copy enabling information is transmitted to the user terminal device.

16. The user terminal device information processing program according to claim 13, to be executed by a computer, further comprising:

a step of intermediating by a server device in the transmission/reception of information between the user terminal device and the server device; and a step of charge processing by the server device for the user at least when copy enabling information is transmitted to the user terminal device.

17. The copy management method of claim 14, further comprising the steps of:

intermediating by a server device in the transmission/reception of information between the user terminal device and the server device; and charge processing by the server device for the user at least when copy enabling information is transmitted to the user terminal device.

* * * * *